(12) United States Patent
Kato et al.

(10) Patent No.: US 6,361,468 B1
(45) Date of Patent: Mar. 26, 2002

(54) AUTOMATIC TRANSMISSION

(75) Inventors: Hiroshi Kato; Kazumasa Tsukamoto; Masahiro Hayabuchi; Masaaki Nishida; Satoru Kasuya; Akitoshi Kato, all of Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 09/466,870

(22) Filed: Dec. 20, 1999

(30) Foreign Application Priority Data

Feb. 16, 1999 (JP) ............................................ 11-037568
May 26, 1999 (JP) ............................................ 11-147320

(51) Int. Cl.$^7$ ................................................. F16H 3/62
(52) U.S. Cl. ......................................................... 475/344
(58) Field of Search ................................. 475/287, 312, 475/313, 324, 325, 344

(56) References Cited

U.S. PATENT DOCUMENTS

| | | | |
|---|---|---|---|
| 4,263,823 A | * 4/1981 | Numazawa et al. | .... 475/269 X |
| 4,594,914 A | * 6/1986 | Kubo et al. | ............. 475/281 X |
| 4,899,621 A | * 2/1990 | Sakakibara | ............. 475/312 X |
| 5,106,352 A | 4/1992 | Lepelletier | .................. 475/280 |
| 5,525,117 A | * 6/1996 | Morisawa et al. | .......... 475/281 |
| 5,533,943 A | * 7/1996 | Ichioka et al. | ............... 475/344 |
| 5,876,300 A | * 3/1999 | Moroto et al. | ............... 475/275 |
| 6,068,572 A | * 5/2000 | Collins et al. | .......... 475/346 X |

* cited by examiner

Primary Examiner—Charles A Marmor
Assistant Examiner—Ankur Parekh
(74) Attorney, Agent, or Firm—Oliff & Berridge, PLC

(57) ABSTRACT

A multi-stage automatic transmission using a reduction planetary gear and a planetary gear set in which the respective thrust forces generated thereat are supported by a low bearing load or a low case load. The automatic transmission is provided with a reduction planetary gear, coupled to an input shaft to fix a reaction force element so as to output a reduction rotation to an output element, and a planetary gear set, that outputs a speed shift rotation upon input of the subsequent reduction rotation. During at least first gear driving, there is provided a force transmission route in which thrust forces generated at one element of the reduction planetary gear and one element of the planetary gear set, respectively, are transmitted. In that route, a torsion direction of the spiral teeth of the respective elements are set such that a direction of a thrust force of the element and a direction of the thrust force of the other element are different from each other during first gear driving.

24 Claims, 24 Drawing Sheets

FIG. 2

| | C-1 | C-2 | C-3 | B-1 | B-2 | B-3 | F-1 | F-2 |
|---|---|---|---|---|---|---|---|---|
| P | | | | | | | | |
| R | | | O | | | O | | |
| N | | | | | | | | |
| 1st | O | | | | | | | O |
| 2nd | O | | | | O | △ | O | |
| 3rd | O | | O | △ | ● | | | |
| 4th | O | O | | | ● | | | |
| 5th | | O | O | | ● | | | |
| 6th | | O | | O | ● | | | |

O: ENGAGEMENT
●: ENGAGEMENT (NO TORQUE TRANSMISSION)
△: ENGAGEMENT DURING ENGINE BRAKING

1st

2nd

3rd

4th

5th

6th

Rev.

FIG. 7

|     | 31              | 32              | 33              | 34           | 35              | 36           | 37               | 38               | 39                |
|-----|-----------------|-----------------|-----------------|--------------|-----------------|--------------|------------------|------------------|-------------------|
| 1st | F3-F1<br>19.381 | F3<br>27.054    | F3<br>27.054    |              |                 |              |                  |                  | F4<br>27.054      |
| 2nd | F3-F1<br>19.381 | F3<br>27.054    | F3<br>27.054    |              | F2<br>11.594    |              | F2<br>11.594     | F2<br>11.594     | F2+F4<br>27.054   |
| 3rd | F3-F1<br>10.081 | F3<br>17.754    | F3<br>17.754    |              | F2<br>7.609     |              | F2<br>7.609      | F2<br>7.609      | F2+F4<br>17.754   |
| 4th | F3-F1<br>5.395  | F3<br>7.530     | F3<br>7.530     |              |                 |              |                  |                  | F4<br>7.530       |
| 5th | F1+F2<br>7.547  | F2<br>5.604     | F2<br>5.604     | F2<br>5.604  |                 |              |                  |                  | F4<br>5.604       |
| 6th | F2<br>4.472     | F2<br>4.472     | F2<br>4.472     | F2<br>4.472  |                 |              |                  |                  | F4<br>4.472       |
| Rev |                 | F1<br>7.673     | F1<br>7.673     |              | F2<br>22.135    | F1<br>7.673  | F1+F2<br>29.808  | F1+F2<br>29.808  | F1<br>7.673       |

5th

6th

Rev.

FIG. 15

|      | 31 | 32 | 33 | 34 | 35 | 36 | 37 | 38 | 39 |
|------|----|----|----|----|----|----|----|----|----|
| 1ST  | F1<br>7.673 | | | | | | | F3<br>27.054 | |
| 2ND  | F1+F2<br>19.648 | F2<br>11.594 | F2<br>11.594 | F2<br>11.594 | | F3<br>27.054 | F3<br>27.054 | F3<br>27.054 | F3–F4<br>11.594 |
| 3RD  | F1+F2<br>25.363 | F2<br>7.609 | F2<br>7.609 | F2<br>7.609 | | F3<br>17.754 | F3<br>17.754 | F3<br>17.754 | F3–F4<br>7.609 |
| 4TH  | F1<br>2.136 | | | | | F3<br>7.530 | F3<br>7.530 | F3<br>7.530 | |
| 5TH  | | F1<br>1.943 | F1<br>1.943 | | F2 (F4)<br>5.604 | F1<br>1.943 | F1+F2<br>7.547 | F1+F2<br>7.547 | F1<br>1.943 |
| 6TH  | | | | | F2 (F4)<br>4.472 | | F2 (F4)<br>4.472 | F2 (F4)<br>4.472 | |
| REV  | F1+F2<br>29.808 | F2<br>22.135 | F2<br>22.135 | F2<br>22.135 | | | | | F4<br>22.135 |

|       | C-1 | C-2 | C-3 | B-1 | B-2 | F-1 |
|-------|-----|-----|-----|-----|-----|-----|
| P     |     |     |     |     |     |     |
| REV   |     |     | O   |     | O   |     |
| N     |     |     |     |     |     |     |
| 1ST   | O   |     |     |     | (O) | O   |
| 2ND   | O   |     |     | O   |     |     |
| 3RD   | O   |     | O   |     |     |     |
| 4TH   | O   | O   |     |     |     |     |
| 5TH   |     | O   | O   |     |     |     |
| 6TH   |     | O   |     | O   |     |     |

FIG. 23

| | 31 | 32 | 34 | 35 | 36 | 38 |
|---|---|---|---|---|---|---|
| 1ST | F1 | | | | F3 | F3 |
| 2ND | F1+F2 | F2 | F2 | | F3 | F3 |
| 3RD | F1+F2 | F2 | F2 | | F3 | F3 |
| 4TH | F1 | F1 | F1 | | F3 | F3 |
| 5TH | | | | F1+F2 | F1+F2 | F1+F2 |
| 6TH | | | | F2 | F2 | F2 |
| REV | F1+F2 | F2 | F2 | | | |

AUTOMATIC TRANSMISSION

BACKGROUND OF THE INVENTION

1. Field of Invention

The invention relates to an automatic transmission and, more particularly, to a technology for supporting a thrust force generated at a change gear element by a power transmission in the gear train.

2. Description of Related Art

In addition to ensuring drivability of a vehicle, there is a demand for multi-staging of an automatic transmission for a vehicle in order to improve the consumption in fuel indispensable to energy saving. To respond to such a request, a change gear mechanism is changed from a conventional forward four-stage transmission to a five-stage transmission. Smaller elements of a gear train per gear change stage and simplification of the mechanism are required to realize further multi-staging in a limited vehicle loading space, requiring tremendous efforts to ensure the proper gear train structure. To accomplish this, there has been proposed a gear train for achieving forward six-stage and reverse one-stage transmission using a planetary gear set consisting of minimum change gear elements in U.S. Pat. No. 5,106,352 which shows a generic automatic transmission. The gear train according to the patent is characterized in that multi-stage gear change is achieved in combination with a reduction planetary gear and a planetary gear set for outputting a change gear rotation by defining the reduction rotation from the reduction planetary gear as an input.

A gear train structure according to the above proposal is principally reasonable in the number of change gear elements per gear change stage required and the required number of clutches and brakes; and, however, there is a practical problem to be addressed and corrected. In particular, in an automatic transmission for a vehicle, generally a helical gear is used for a sun gear, a pinion, and a ring gear that constitute a planetary gear in order to reduce gear noises. An advantage of such a structure is that the gear rates of the respective gears are increased by the helical gear, making it possible to reduce gear noises. In contrast, there is a problem that a thrust force contrary to the ring gear and sun gear, respectively, is generated.

The above patent does not address the problem in the thrust force or its solution. When the concepts, known to those of general skill, as employed in a conventional automatic transmission, are extended and applied to the above proposed gear train, the result is a method for disposing a center support between a reduction planetary gear (a single planetary gear set) and a planetary gear set (complex planetary gear set), thereby subjecting the center support and a case to the thrust force generated at the respective planetary gear sets by the power transmission so as not to interfere with each other. If such a structure is adopted, the axial dimensions of a transmission are increased by the arrangement of the center support. Thus, in particular, there is a problem that the ability to mount the gear on a vehicle is degraded because a large-scaled mechanism due to the multi-staging is unavoidable in a multi-stage transmission.

SUMMARY OF THE INVENTION

The present has been achieved to solve the above mentioned problem. It is one object of the invention to provide an automatic transmission capable of supporting a thrust force acting on a reduction planetary gear and a planetary gear set, respectively, without increasing axial dimensions of the transmission.

To achieve the above mentioned object, according to the invention, there is provided an automatic transmission for achieving a multi-stage gear change by a reduction planetary gear coupled to an input shaft and a fixed reaction force element so as to output a reduction rotation to an output element and a planetary gear set that outputs a rotation with a variable speed depending on the shift position upon input of the reduction rotation from the reduction planetary gear, in which a torsion direction of the helical teeth of the respective elements is set such that that a direction of the thrust force of the one element of the reduction planetary gear and a direction of the thrust force of the one element of the planetary gear set are different from each other during driving at one of a plurality of gear speeds.

In the above described structure, it is effective that the torsion direction is set such that a thrust force generated at one element of the reduction planetary gear and a thrust force generated at one element of the planetary gear set face each other during driving at the first gear speed; a bearing subjected to thrust forces generated at the respective elements in common is provided in the common force transmission route; and the bearing is subjected to a differential thrust force between a thrust force acting on one element of the planetary gear set and a thrust force acting on one element of the reduction planetary gear.

In addition, in the above mentioned structure, the foregoing torsion direction is a direction in which the thrust force generated at the one element of the reduction planetary gear and the thrust force generated at the one element of the planetary gear set depart from each other during first gear driving; a bearing subjected to a thrust force generated at the respective elements is provided; and the bearing is subjected to the thrust force acting on the one element of the planetary gear set and the thrust force acting on the one element of the reduction planetary gear independently.

In any of the above described structures, it is effective that a reaction force element of the reduction planetary gear is fixed to a case, and a thrust force to be transmitted to the common force transmission route is transmitted to the case via the bearing.

In addition, in any of the above described structures, it is effective that a carrier of the planetary gear set is supported axially on the common force transmission route.

Further, in any of the above described structures, it is effective that the planetary gear set includes a first sun gear as one element thereof and a second sun gear independent of the first gear; and a bearing subjected to a thrust force acting on the second sun gear is disposed on a passage different from the common force transmission route.

Furthermore, in any of the above described structures, it is effective that the planetary gear set includes a first sun gear and a second sun gear independent of the first sun gear; and a bearing is disposed between the first and second sun gears.

Still further, in any of the above described structures, it is effective that the foregoing one element of the reduction planetary gear is a ring gear.

Furthermore, in any of the above described structures, it is effective that a reaction force element of the reduction planetary gear is fixed to an oil pump case; and a thrust force generated at the foregoing one element of the reduction planetary gear is transmitted to the oil pump case via the bearing.

Moreover, it is effective that the reduction planetary gear consists of a sun gear formed as the reaction force element;

a carrier coupled with the foregoing one element of the planetary gear set for supporting a pinion geared with the sun gear; and a ring gear geared with a pinion supported by the carrier as the foregoing one element of the reduction planetary gear coupled with the input shaft via a coupling member, in which the bearing is disposed between the sun gear and the coupling member.

It is effective that the foregoing one element of the planetary gear set is a sun gear, the coupling member is disposed between the reduction planetary gear and the planetary gear set; and a second bearing is disposed between the coupling member and the sun gear.

Moreover, it is effective that the planetary gear set is formed as a planetary gear set of Ravigneaux type consisting of long and short pinions supported by a carrier and geared with each other; a first sun gear geared with the long pinion; a second sun gear geared with the short pinion; and a ring gear geared with any one of the long and short pinions.

Further it is effective that the ring gear is geared with the short pinion.

Furthermore, it is effective that the ring gear is geared with the long pinion.

Still furthermore, it is effective that the long pinion is geared with the first sun gear at one end thereof, and the ring gear is geared with the other end of the long pinion.

Moreover, it is effective that the input shaft is further geared with a carrier of the planetary gear set via another coupling member; a third bearing is disposed between the sun gear of the planetary gear set and another coupling member; a fourth bearing is disposed between the case and another coupling member, and a thrust force of the ring gear of the reduction planetary gear is transmitted to a case via second, third, and fourth bearings during reverse driving.

In the structure according to a first aspect, during first gear driving in which a driving force is the greatest, and a load due to a thrust force is applied, the respective thrust forces of a reduction planetary gear and a planetary gear set are set in a direction different from (opposed to or opposite to) each other depending on a combination of the torsion directions of the helical teeth that are gear change elements. Thus, when these directions face with or are opposed to each other, a thrust force of one element of the planetary gear set acts to a common force transmission route in one direction, and a thrust force of one element of the reduction planetary gear acts thereto in the other direction. As a result, the invention is structured so as to subject the outside of the common force transmission route to a differential thrust force. In addition, when the above directions are opposite to each other, no thrust force acts in the common force transmission route. As a result, the invention is structured so as to subject the outside of the common force transmission route to the respective thrust forces. Therefore, the durability of members subjected to the thrust forces can be prevented from being lowered. In addition, the thrust forces generated respectively at the reduction planetary gear and the planetary gear set are directionally opposed to each other, and are buffered to each other, thus making it unnecessary to provide a center support for receiving the thrust forces, and making it possible to reduce axial dimensions of the transmission correspondingly.

Next, in the structure according to a second aspect, a thrust force acting on one element of a planetary gear set and a thrust force acting on one element of a reduction planetary gear are opposed or facing to each other, and are offset, thereby making it possible to reduce a thrust force applied to a bearing arranged outside of a common force transmission route. Thus, the bearing can be compactly structured and, further, axial dimensions of the transmission can be reduced.

In addition, in the structure according to a third aspect, during first gear driving in which a driving force is the greatest, and a load due to a thrust force is applied, a thrust force acting on one element of a planetary gear set and a thrust force acting on one element of a reduction planetary gear are applied independently without being buffered to each other, thereby making it possible to reduce a trust force applied to a bearing arranged outside of a common force transmission route. Thus, the bearing can be compactly structured and, further, axial dimensions of the transmission can be reduced.

In the case where a reaction force element of a reduction planetary gear is not fixed to a case, another thrust bearing must be provided between the case and the reaction force element of the reduction planetary gear, the reaction force element fixed by appropriate fixing means, and, thus, an increase in axial dimensions of the transmission is unavoidable. In contrast, in the structure according to a fourth aspect, a sun gear is integrally fixed to a case, thereby making it possible to have only the bearing subjected to a thrust force and, further, making it possible to reduce the axial dimensions.

At least one end of a carrier of a planetary gear set is required to be axially supported. In the case where the support is used outside of the force transmission route, a support member of the carrier is intervened on a thrust force transmission route and, thus, the number of thrust bearings is increased. In contrast, in the structure according to a fifth aspect, a carrier is supported on a common force transmission route, thus making it possible to reduce the number of thrust bearings.

In the structure according to a sixth aspect, a thrust force of a common force transmission route acts to a first sun gear of a planetary gear set. In contrast, a second sun gear can be structured so that a thrust force of the first sun gear or reduction planetary gear transmitting a common force transmission route does not act to the second sun gear. Therefore, a bearing receiving the thrust force generated at the second sun gear can be compactly structured for receiving only the thrust force of the second sun gear outside of the common force transmission route.

In the structure according to a seventh aspect, a thrust force generated at a first sun gear can be transmitted between the first and second sun gears via a bearing.

Thus, as is the case where the thrust force generated at the first sun gear is transmitted via a carrier of a pinion gear geared thereto, arrangement of a bearing due to the carrier intervened in the force transmission route for thrust force transmission can be eliminated, thereby making it possible to reduce the number of bearings in a common force transmission route.

In the structure according to an eighth aspect, a ring gear and a sun gear of a reduction planetary gear face each other against the thrust force applied thereto with a bearing interposed between the gears. A thrust force to be transmitted from the ring gear to the case via a bearing is offset in opposition to the sun gear. Thus, it is possible to reduce the load upon members, such as case for receiving the thrust force via the bearing, and prevent its durability from being lowered.

In the structure according to a ninth aspect, a thrust force applied to an oil pump case can be reduced, thus making it possible to prevent the durability of the oil pump case from being lowered.

In the structure according to a tenth aspect, a large-scale thrust bearing, abutted against a sun gear of a reduction planetary gear, is not needed because of the reduction in the above thrust force. In the case where a structure having a bearing abutted against a tooth bottom of the sun gear is adopted, there is no need for increasing the tooth diameter of the sun gear in order to ensure an abutment face, and an increase in radial dimensions of the reduction planetary gear can be prevented. In addition, even in the case where a structure having a bearing abutted with the tooth end of the sun gear is adopted, there is no need for thickening a bearing race in order to ensure rigidity. As a result, an increase in the axial dimensions of the force transmission route can be prevented.

In the structure according to an eleventh aspect, in the case where a thrust force of a sun gear of a planetary gear set is greater than a thrust force of a ring gear of a reduction planetary gear, the thrust force from the sun gear is transmitted to a first bearing via a second bearing; and a thrust force of a ring gear of a reduction planetary gear is transmitted to the second bearing in opposition to the thrust force of the sun gear. Therefore, the thrust force offset in a common force transmission route is received by the first bearing, and the bearing can be compactly structured.

Further in the structure according to a twelfth aspect, a planetary gear set of Ravigneaux type is employed, thereby making it possible to reduce axial dimensions of the planetary gear set by the common use of a carrier.

In the structure according to a thirteenth aspect, power is transmitted on a short pinion side that does not cause a rotational moment, thereby making it possible to prevent an occurrence of rotational moment on along pinion side and reduce a load applied to a carrier and a rotation support portion of the career.

In the structure according to a fourteenth aspect, radial dimensions can be reduced more significantly than in the case where a ring gear meshes with a short pinion.

In the meantime, in the case where a planetary gear set of Ravigneaux type is employed or in the case where a sun gear and a ring gear are geared with each other in opposition to a long pinion, if the thrust directions of the sun gear and ring gear are defined in opposition to each other, a thrust force is generated at the long pinion geared with the sun gear and ring gear in a departure direction because of its long pinion length. Further, a separate force is generated as a way force between the gears in gear engagement, and acts in a direction in which the gears face each other. As a result, moments due to a thrust force and a separate force act to a long pinion in a synergistic manner, and a load acting on a support portion of the long pinion is increased.

In contrast, in the structure according to a fifteenth aspect, a torsion angle is set so that a direction in the thrust force generated at the sun gear of the planetary gear set faces a direction in the thrust force generated at the ring gear of the reduction planetary gear. As a result, a thrust force different from that of the sun gear is generated at the ring gear of the planetary gear set, and this force acts in a direction in which a moment is offset. Therefore, a load applied to the support portion of the long pinion can be reduced.

In the structure according to a sixteenth aspect, a thrust force generated at a ring gear of a reduction planetary gear is received by a case via second, third, and fourth bearings in reverse driving. Hence, a clearance between members is decreased more significantly than that obtained in a method for dividing a thrust force via an input shaft, thus, making it possible to reduce axial dimensions.

BRIEF DESCRIPTION OF THE DRAWINGS

FIG. 2 is an operational table showing a gear train of the automatic transmission;

FIG. 7 is a table showing the thrust force applied to each bearing of the gear train by coefficient;

FIG. 15 is a table showing the thrust force applied to each bearing of the gear train by coefficient;

FIG. 23 is a table showing the thrust force applied to each bearing of the gear train;

DETAILED DESCRIPTION OF PREFERRED EMBODIMENTS

Hereinafter, preferred embodiments of the invention will be described with reference to the accompanying drawings.

Figure 1:
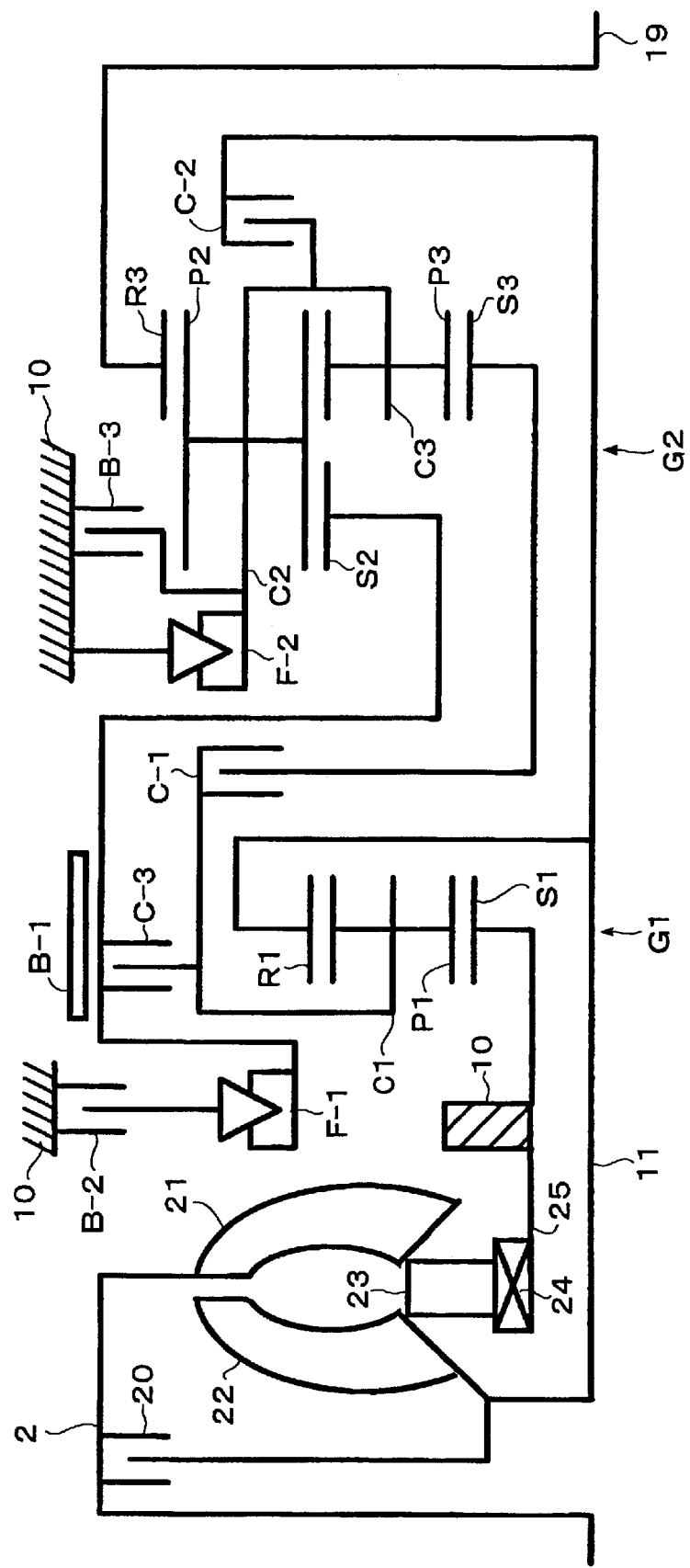
FIG. 1 is a skeleton view showing an automatic transmission according to a first embodiment of the invention.

FIG. 1 is a skeleton diagram showing a first embodiment in which the invention is applied to a longitudinal type automatic transmission for use in a front engine, rear drive (FR) vehicle. The automatic transmission is provided with a reduction planetary gear G1 for outputting a reduction rotation to a carrier C1, that is an output element, by being coupled with an input shaft 11 and fixing a sun gear S1, that is a reaction force element; and a planetary gear set G2 for outputting a rotation with a variable speed depending on the shift position by defining the reduction rotation from the reduction planetary gear G1 as an input, thereby achieving multi-stage gear change including forward six-stage gear and reverse one-stage gear.

In more detail, according to the automatic transmission, there is adopted a structure in which a torque converter 2 with a lockup clutch 20, to be coupled with an engine (not shown), is arranged at the most front part of the transmission; and a change gear mechanism is arranged at the back. The torque converter 2 is provided with a pump impeller 21, a turbine runner 22, a stator 23 arranged between the impeller 21 and the turbine runner 22, a one-way clutch 24 for causing the stator 23 to be engaged with a transmission case 10 during uni-directional rotation, and a stator shaft 25 for fixing an inner race of the one-way clutch to the transmission case 10.

The reduction planetary gear G1 is composed of a simple planetary gear having a ring gear R1, serving as an input element as one element thereof, is coupled with the input shaft 11, in which a carrier C1, serving as an output element for a reduction rotation, is coupled with a sun gear S3, having a small diameter, of a planetary gear set G2 via a multiple plate clutch C-1, and is coupled with a sun gear S2, having a large diameter, of the planetary gear set G2 in the same manner as the above via a multiple plate clutch C-3; and a sun gear S1 serving as a fixing element that obtains reaction force is fixed to the transmission case 10.

The planetary gear set G2 consisting essentially of a change gear mechanism is composed of the pair of sun gears S2, S3 having small and large diameters; and a gear set of Ravigneaux type consisting of a carrier C2 (C3) supporting long and short pinions P2, P3, geared with each other, one side of which meshes with the sun gear S2 having the large diameter and meshes with the ring gear R3, and the other end of which meshes with the sun gear S3 having the small diameter. The sun gear S2 having the large diameter is capable of being engagingly locked with the case 10 by means of a brake B-1 consisting of a band brake, a one-way clutch F-1 provided in parallel thereto, and a multiple plate brake B-2 enabling its engagement. The carrier C2 (C3) can be engagingly locked with the case 10 by means of the one-way clutch F-2 provided in parallel with and by the multiple plate brake B-3. The carrier C2 (C3) serving as an input element for non-reduction rotation of the planetary gear set G2 is coupled with the input shaft 11 via the multiple plate clutch C-2, and a ring gear R3, serving as an output element for a rotation with a variable speed depending on the shift position, is coupled with an output shaft 19.

The thus structured automatic transmission is controlled by means of an electronic control device and a hydraulic control device (not shown), and performs gear change based on a vehicle load and a vehicle speed in a range of gear change stages according to the selected range by a driver. FIG. 2 schematically shows a gear change stage achieved by engagement and disengagement of each clutch, brake, and one-way clutch (the mark ● designates engagement; no mark designates disengagement; A designates engagement only during engine brake; and ● designates engagement that is not acted directly to achieve a gear change stage). In addition, FIG. 3 shows a relationship between a gear change stage achieved by engagement of each clutch, brake, and one-way clutch (● designates engagement thereof) and the relative rotation ratio of each gear change element.

Figure 3:
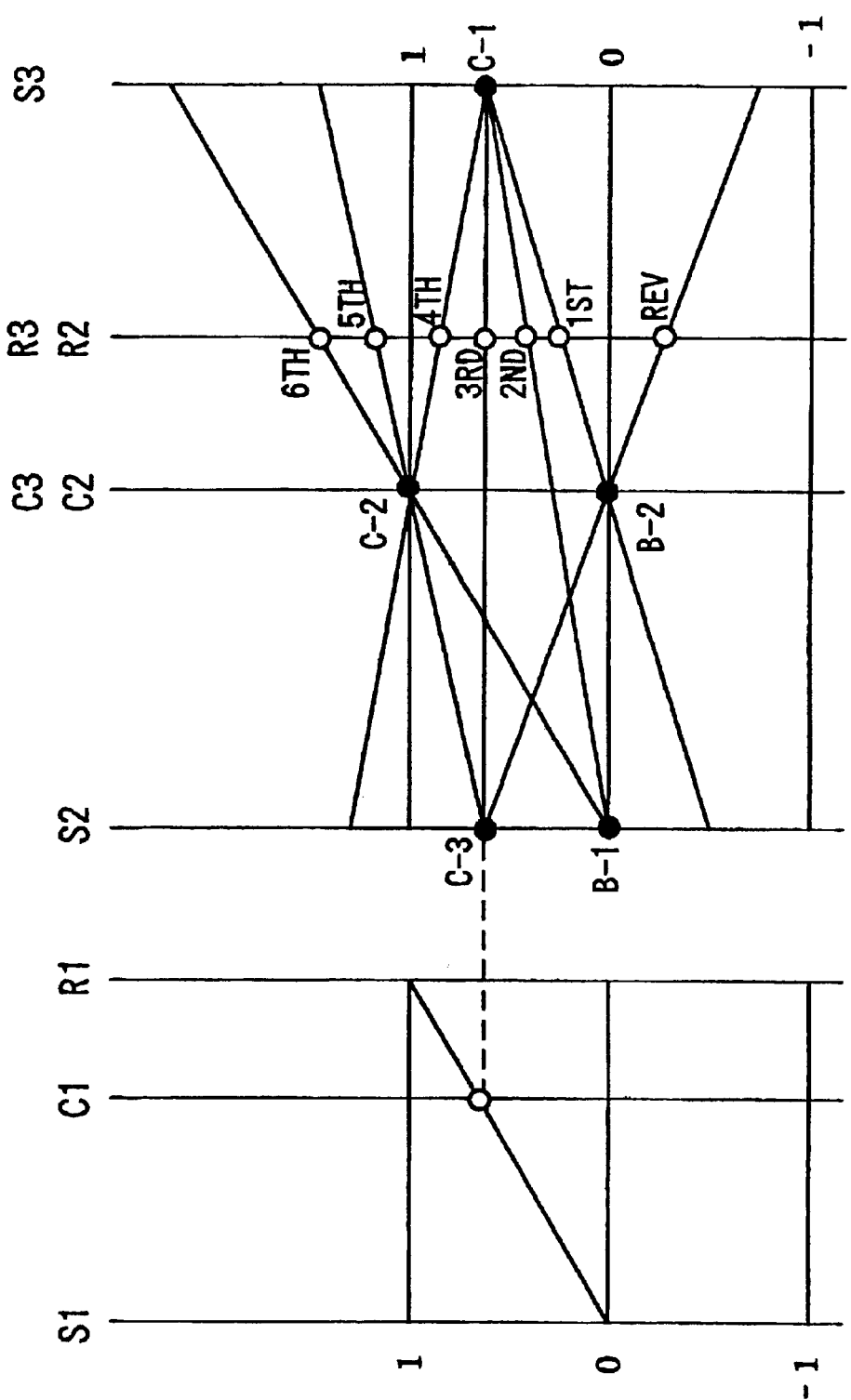
FIG. 3 is a speed diagram of the gear train.

As is evident by referring to FIGS. 2 and 3, a first gear (1st) is achieved by the engagement of clutch C-1 and brake B-3 (In the embodiment, as is evident by referring to the operation chart of FIG. 2, engagement of one-way clutch F-2 is employed with the clutch C-1 instead of engaging the clutch C-1 and brake B-3. The reason why this engagement is employed and why such an engagement of one-way clutch F-2 corresponds to engagement of brake B-3 will be described later in detail.). In this case, referring to FIG. 1, a rotation decelerated from the input shaft 11 via the reduction planetary gear set G1 is inputted to the sun gear S3 having a small diameter of the planetary gear set G2 via the clutch C-1; the reaction force for the carrier C2 (C3) engagingly locked by engagement of the one-way clutch F-2 is obtained; and a reduction rotation of the maximum reduction ratio of the ring gear R3 is outputted to the output shaft 19.

Next, a second gear (2nd) is achieved by engagement of the clutch C-1, the engagement of the one-way clutch F-1, corresponding to the engagement of brake B-1, and engagement of brake B-2 enabling the engagement of one-way clutch F-1 (A reason why these engagements correspond to engagement of brake B-1 will be described later in detail). In this case, a rotation decelerated from the input shaft 11 via the reduction planetary gear G1 is inputted by the sun gear S3 having a small diameter of the planetary gear set G2 via clutch C-1; reaction action is obtained for the sun gear S2 having a large diameter engagingly locked by engagement of brake B-2 and one-way clutch F-1; and a reduction rotation of the ring gear R3 is outputted to the output shaft 19. At this time, the reduction ratio is smaller than the first gear (1st) as seen in FIG. 3.

In addition, a third gear (3rd) is achieved by simultaneous engagement of clutches C-1 and C-3. In this case, a rotation decelerated from the input shaft 11 via the reduction planetary gear G1 is inputted to the sun gear S2 and the sun gear S3 of the planetary gear set G2 simultaneously via clutches C-1, C-3 and the planetary gear set G2 enters a direct contact state. Thus, rotation of the ring gear R3 is identical to the rotation inputted to both sun gears S2, S3 and is outputted to the output shaft 19 as decelerated rotation for rotation of the input shaft 11.

Further, a fourth gear (4th) is achieved by simultaneous engagement of clutches C-1, C-2. In this case, on one hand, rotation decelerated from the input shaft 11 via the planetary gear Gi is inputted to the sun gear S3 of the gear set G2 via clutch C-1 and, on the other hand, non-reduction rotation inputted from the input shaft 11 via clutch C-2 is inputted to the carrier C2 (C3). Intermediate rotation of the two input rotations is outputted to the output shaft 19 as rotation of the ring gear R3 slightly decelerated to rotation of the input shaft 11.

Next, fifth gear (5th) is achieved by simultaneous engagement of clutches C-2, C-3. In this case, on one hand, rotation decelerated from the input shaft 11 via the reduction planetary gear GI is inputted to the sun gear S2 of the planetary gear set G2 via clutch C-3 and, on the other hand, non-reduction rotation inputted from the input shaft 11 via clutch C-2 is inputted to the carrier C2 (C3). Rotation, slightly accelerated by rotation of the input shaft 11, of the ring gear R3 is outputted to the output shaft 19.

A sixth gear (6th) is achieved by engaging clutch C-2 and brake B-1. In this case, non-reduction rotation is inputted from the input shaft 11 only to the carrier C2 (C3) of the planetary gear set G2 via a clutch C-2; reaction force is obtained by the sun gear S2 engaged by the engagement of brake B-1, and further accelerated rotation of the ring gear R3 is outputted to the output shaft 19.

A reverse gear (Rev) is achieved by engaging clutch C-3 and brake B-3. In this case, rotation decelerated from the input shaft 11 via the reduction planetary gear G1 is inputted to the sun gear S2 of the planetary gear set G2 through the clutch C-3, and reaction force is obtained by the carrier C2 (C3) engaged by the engagement of brake B-3, and inversion of the ring gear R3 is outputted to the output shaft 19.

Each gear change stage thus achieved becomes a good speed stage with its relatively constant intervals to each gear change stage as is qualitatively evident by referring to a vertical interval marked with the mark ○ indicating a speed ratio of the ring gear R3 on the speed graph of FIG. 3 (ring gear R3 can be considered ring gear R2 when associated with or driven by sun gear S2 through opinion P2).

Hereinafter, a relationship between the above mentioned one-way clutch F-2 and brake B-3 and a relationship of the one way clutch F-1 and the brakes B-1, B-2 will be described. As is seen in an engagement and disengagement relationship of the brakes B-1, B-3 during the above first and second speeds, both of the brakes become so-called substituted frictional elements in which one engagement is performed at the same time as the other disengagement during up and down shift between gear change stages. The substitution of the frictional element requires precise simultaneous control of the engagement and disengagement pressures of a hydraulic servo operating them. To perform such control, an added control valve or complicated hydraulic circuit for that purpose is indispensable. In the embodiment, the engagement direction of one-way clutch F-2 is set in accordance with the reaction force torque support direction during the first gear using the fact that the reaction force torque applied to the carrier C2 (C3) is inverted at the first and second gears. In this manner, a function identical to the engagement of the brake B-3 is substantially imparted to one-way clutch F-2, and engagement of the carrier C2 (C3) is performed instead of engagement of brake B-3 during a first gear (however, a direction of the reaction force torque applied to engagement of brake B-3 during a first gear is inverted to an engine driving state in a vehicle coast state of wheel driving and, thus engagement of brake B-3 is required to attain an engine brake effect as indicated by the mark Δ in FIG. 2). Therefore, a structure to achieve a first gear also can be obtained by the engagement of brake B-3, without the use of one-way clutch F-2.

A relationship similar to the above is met in the case of the sun gear S2. In this case, an engagement direction of one-way clutch F-1 is set in accordance with a reaction force torque support direction during a second gear, thereby making it possible to substantially impart a function identical to engagement of brake B-1 to one-way clutch F-1. However, the sun gear S2, which is not associated with the carrier C2 (C3), is not only engaged to attain an engine brake effect during a second gear, but requires brake B-1, that is, a change gear element, to be engagingly locked for the purpose of achievement of the sixth gear. In addition, as seen from the speed graph of FIG. 3, the sun gear S2 is inverted against the input rotation direction during first gear achievement, but in the case of a gear stage of the third gear or more, the gear rotates in the same direction as the input rotation direction. Therefore, one-way clutch F-1 cannot be coupled directly with a fixing member, and the effectiveness of an engagement state can be controlled by serial arrangement together with brake B-2.

Figure 4:
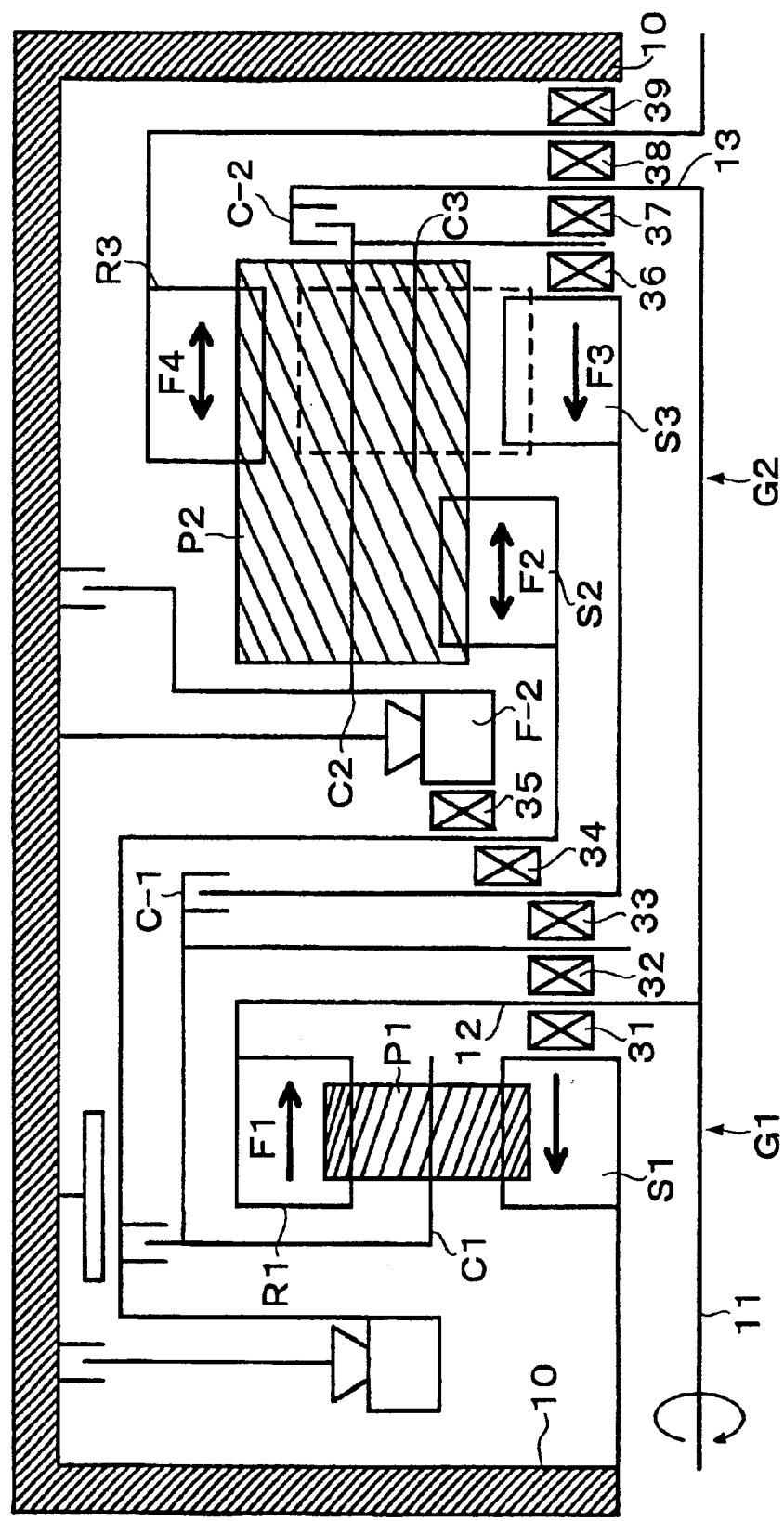
FIG. 4 is a schematic cross-sectional view showing the gear train in more detail.

Next, FIG. 4 shows a schematic cross-sectional view embodying the change gear mechanism portion of the above gear train. In accordance with basic features of the invention, during at least the above first gear driving, the automatic transmission is provided with a common force transmission route in which thrust forces F1 and F3 generated respectively at the ring gear R1 of the reduction planetary gear G1 and the sun gear S3 of the planetary gear set G2 are achieved. The torsion direction of helical teeth of the respective elements is set such that a direction of the thrust force F1 of the ring gear R1 of the reduction planetary gear G1 and a direction of the thrust force F3 of the sun gear S3 of the planetary gear set G2 are different (opposite to or opposed to) from each other in this common force transmission route during first gear driving. In this embodiment, as the torsion direction, of the above directions different (opposite to or opposed to) from each other, a direction in which the thrust forces generated at the ring gear R1 of the reduction planetary gear G1 and the sun gear S3 of the planetary gear set G2 face, or opposed to, each other during first gear driving. Specifically, in the case where a rotational direction of the input shaft 11 is turned clockwise as seen from its front side, the torsion direction of the helical teeth is set in the clockwise direction for the pinion P1 of the reduction planetary gear set G1, and is set in the counterclockwise direction for the long pinion P2 of the planetary gear set G2. Naturally, the torsion direction of the helical teeth of another element including the ring gear R3 geared with the pinion P2 and the sun gear S3 geared with the long pinion P2 via the short pinion P3 is properly set.

The gear train includes a number of bearings on a force transmission route for transmitting a thrust force generated at the reduction planetary gear G1 and the planetary gear set G2. A first bearing 31 among the bearings is disposed between the sun gear S1 of the reduction planetary gear G1 and a coupling member 12 for transmitting an input rotation to the ring gear R1. In addition, a pair of second bearings 32, 33 are arranged between the coupling member 12 and an extension of the sun gear S3 of the planetary gear set G2. Further, a pair of third bearings 36, 37 are disposed between the sun gear S3 of the planetary gear set G2 and the other coupling member 13 transmitting an input rotation to the carrier C2 (C3). Similarly, a pair of bearings, called fourth bearings 38, 39 are arranged between the other coupling member 13 and the case 10. Therefore, of these bearings, the first bearing 31 receives a differential thrust force in a common force transmission route between the thrust force F3 acting on the sun gear S3 as one element of the planetary gear set G2 and the thrust force F1 acting on the ring gear R1 as one element of the reduction planetary gear G1. Further, a pair of bearings, called fifth bearings, 34, 35 for receiving the thrust force in both directions of the sun gear S2 are disposed among an extension of the sun gear S3 of the planetary gear set G2, the hub side member of clutch C-1, and one-way clutch F-2.

In the embodiment, the sun gear S1, that is a reaction force element of the reduction planetary gear G1, is fixed to a case 10. In this structure, as is the case in which the sun gear S1 is fixed to the case 10 via another fixing means, the need for arranging another thrust bearing between the sun gear S1 and the case 10 is eliminated, and an increase in axial dimensions of the transmission is avoided. With this structure, the thrust force to be transmitted to a common force transmission route is transmitted to the case 10 via a bearing 31.

In addition, in the embodiment, a structure is adopted such that the planetary gear set G2 is set to a planetary gear set of Ravigneaux type; its ring gear R3 meshes with the long pinion P2; the long pinion P2 meshes with a first sun gear S2 at one end thereof; and the ring gear R3 meshes with an another end of the long pinion P2. This structure is helpful to reduce axial dimensions of the planetary gear set G2 by using the carrier C2 (C3) in common.

In addition, the input shaft 11 is coupled with the carrier C3 (C2) of the planetary gear set G2 via another coupling member 13 and the clutch C-2; third bearings 36, 37 are arranged between the sun gear S3 of the planetary gear set G2 and the other coupling member 13; and fourth bearings 38, 39 are arranged between the case 10 and the other coupling member 13. With this arrangement, during reverse driving, the thrust force F1 of the ring gear R1 of the reduction planetary gear G1 is transmitted to the case 10 via the second bearings 32, 33, the third bearings 36, 37, and the fourth bearings 38, 39.

Figure 5:
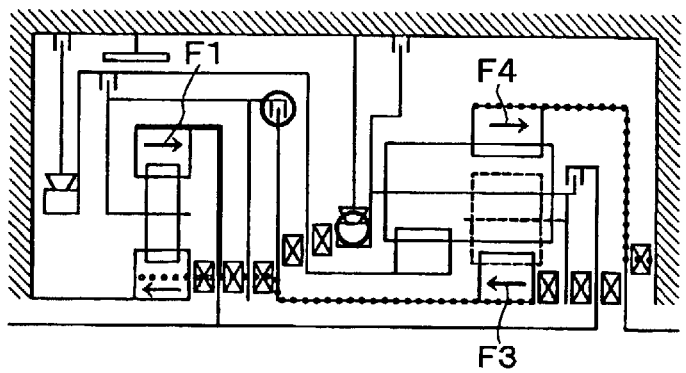
FIG. 5 is a schematic cross-sectional view showing thrust forces when the driving force of the gear train is transmitted for each of the first to fourth gear change stages.
Figure 5:
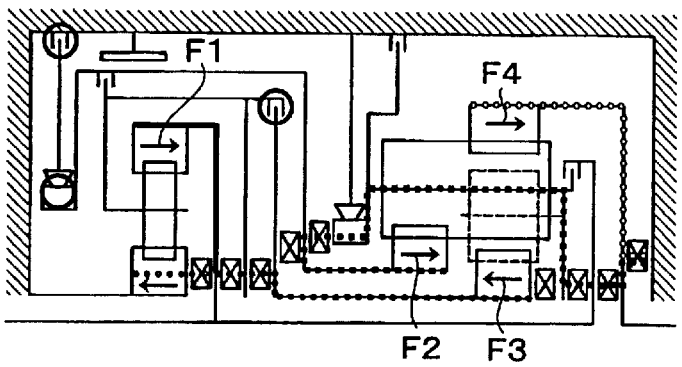
Figure 5:
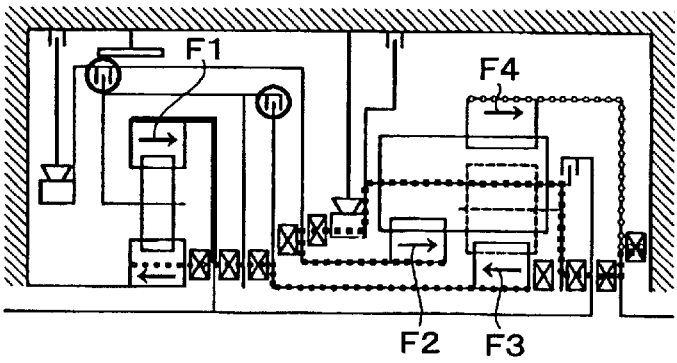
Figure 5:
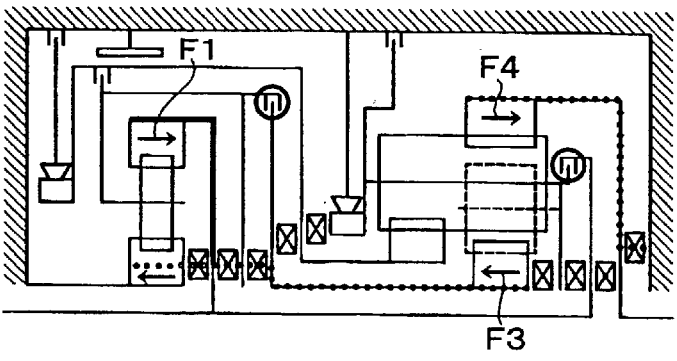
Figure 6:
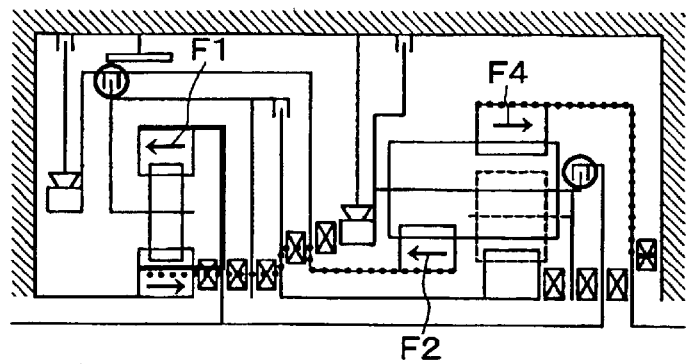
FIG. 6 is a schematic cross-sectional view showing the thrust force with respect to the fifth, sixth, and reverse gears.
Figure 6:
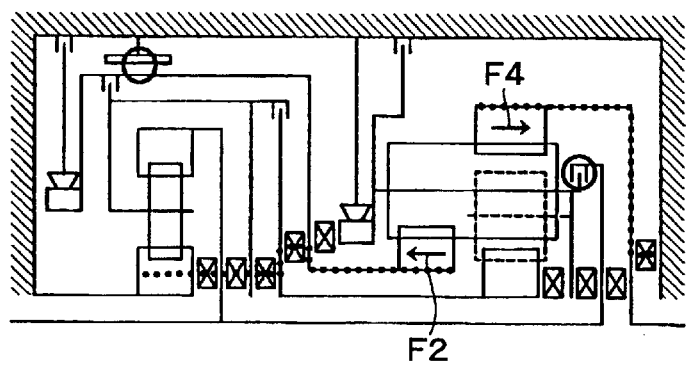
Figure 6:
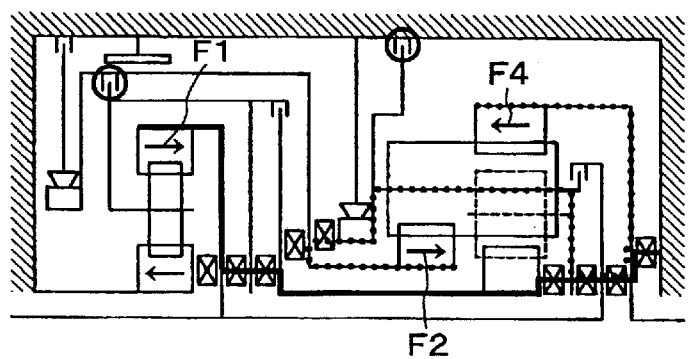

FIGS. 5 and 6 are schematic cross-sectional views showing a change of the thrust force in each of the gear change stages. Referring to FIG. 5 (see to FIG. 4 for the details of reference numerals designating each member), during first gear (1st) driving, power is transmitted via the ring gear R1, pinion P1, and carrier C1 of the reduction planetary gear G1, clutch C-1 (The engagement state is marked with ● for all engagement elements), sun gear S3 of the planetary gear set G2, short pinion P3 and long pinion P2, an ring gear R3. Therefore, from a relationship in torsion direction of the helical teeth, with respect to the ring gear R1 of the reduction planetary gear G1, the forward thrust force (undesignated, the direction indicated by a left-pointing arrow) generated at the sun gear S1 is supported by the case 10; and the backward thrust force F1, as its reaction force (indicated by the right-pointing arrow), is transmitted to the coupling member 12 for coupling the ring gear R1 to the input shaft 11 as indicated by a thick line for the force transmission route. On the other hand, with respect to the sun gear S3 of the planetary gear G2, the backward thrust force of the ring gear R3 (indicated by the right-pointing arrow) is supported by the immediately close case 10 via the bearing 39 as indicated by the mark ● for the force transmission route; and the forward thrust force F3 (indicated by the left-pointing arrow) as its reaction force is transmitted from an extension of the sun gear S3 to the coupling member 12 via the second bearing 33, 32 similarly as indicated by the mark ●. Thus, thrust forces F1 and F3 are applied to the coupling member 12 in mutually offset directions. As a result, the resultant reduced forward thrust force F3−F1 is applied to the bearing 31. Here, the driving in the first gear designates a state in which the transmission is rotated by an engine, and a vehicle is accelerated. In contrast, a coast in first gear designates a state in which the transmission is rotated by a vehicle wheel, and a vehicle is decelerated.

FIG. 7 is a table showing the thrust force applied to each bearing during driving at each gear change stage. As seen in the table, the thrust force F3 of the planetary gear set G2 is applied intact to each of the second bearings 32, 33, and a differential thrust force F3−F1 obtained by subtracting the thrust force F1 of the reduction planetary gear G1 from the above thrust force F3 is applied to the bearing 31. The numeric values in the graph designate the thrust force coefficients of the reduction planetary gear G1 and planetary gear set G2 when a torsion angle of the helical teeth is set to 25 degrees. This value is obtained from the shared torque of reduction planetary gear G1, the sun gears S2, S3 of the planetary gear set G2, and the ring gear R3 (R2), respectively.

Next, during second gear (2nd) driving, as during the first gear, power is transmitted via the sun gear S3 of the planetary gear set G2, short and long pinions P3, P2, and ring gear R3. In this case, the sun gear S2 of the planetary gear set G2 shares a reaction force torque due to engagement of one-way clutch F-1 and brake B-2. Thus, the thrust force F4 of the ring gear R3 and the thrust force F2 of the sun gear S2 are applied to the bearing 39 along force transmission routes indicated by ○ and ■. In addition, the thrust force applied to the bearing 31 as indicated by ● for the force transmission route, is similar to that during the first gear as shown in FIG. 7.

Next, during ring third gear (3rd) driving, power transmission is merely different from that during second gear driving in that the sun gear S2 of the planetary gear set G2 rotates. There is no particular reference in torque sharing of the elements associated with torque transmission. Thus, as is evident by referring to FIG. 7, a relationship in thrust forces is similar to that during second gear driving except that the value is reduced with an increase in the reduction ratio.

Further, during fourth gear (4th) driving, power is transmitted in a state where torque transmission from the sun gear S2 of the planetary gear set G2 is not performed for the third gear. Therefore, a relationship in thrust force transmitted forward via a common force transmission route, marked with ● in the figure, is similar to that during the third gear driving except that the value becomes small due to the decrease in the reduction ratio. In addition, the thrust force transmitted backward is equal to a relationship in which the thrust force F2 of the sun gear S2 of the planetary gear set G2 is eliminated.

Next, during ring fifth gear (5th) driving, as shown in FIG. 6, power transmission is different from that during any other gear driving a reduction rotation is inputted to the sun gear S2 of the planetary gear set G2, and a non-reduction rotation is inputted to the carrier C2 (C3). As a result, the sun gear S2 of the planetary gear set G2 enters a state in which the sun gear S2 receives a driving torque via the long pinion P2 in response with an output of the ring gear R3. As a result, the thrust force F2 applied to the sun gear S2 of the planetary gear set G2 is reversed and, thus, thrust force F2 is applied to the first bearing 31 via the bearing 34 and the second bearings 33, 32 of the common force transmission route marked with the mark ● in the drawing. The thrust force F1 in the same direction due to the reduction planetary gear G1 acts on the first bearing 31 and, thus, the thrust force F1+F2 in which both of these forces are added is applied to first bearing 31. However, in this gear change stage, the transmission torque is reduced by acceleration. As is evident by referring to FIG. 7, the thrust force F2 itself is far smaller than that when the first or second gear is engaged. Thus, the bearing load is smaller than when the 1st and 2nd gear change stages are active, and duplication of the thrust force direction at the first bearing 31 is not particularly problematic.

Further during sixth gear (6th) driving, power transmission is achieved only on the planetary gear set G2 side between the long pinion P2 and the ring gear R3, and the sun gear S2 of the planetary gear set G2 supports a reaction force torque. At this time, the torque applied to the ring gear R3 and the sun gear S2 of the planetary gear set G2 is further reduced by acceleration to an input rotation and, thus, the thrust force is reduced. In this case, the thrust force F4 of the ring gear R3 is supported by the case 10 via the bearing 39 in the force transmission route marked with ● in the drawing; and the thrust force F2 of the sun gear S2 of the planetary gear set G2 is supported by the case 10 via three bearings 34, 33, 32 coupling member 12, and first bearing 31 in the force transmission route also marked with ● in the drawing.

On the other hand, during reverse (Rev) driving, power is transmitted through the reduction planetary gear GI between the sun gear S2 of the planetary gear set G2 and the ring gear S3 via the long pinion P2. In this case, the output of the ring gear R3 is inverted in response to an input of the sun gear S2 of the planetary gear set G2. Thus, the thrust force F4 of the ring gear R3 is offset opposite to the thrust force F2 of the sun gear S2 of the planetary gear set G2; and only the thrust force F1 of the ring gear R1 of the reduction planetary gear G1 is transmitted to the case 10 through each of the second bearings 32, 33, and bearings 36 to 39 after the second bearing 32, 33 in a common force transmission route. However, both of the bearings 37, 38 provided are in a force transmission route marked with ● in the drawing in which the thrust force F4 and the thrust force F2 are in opposition, and the bearings 37, 38 receive a force in which the thrust forces F2 and F1 are added.

Meanwhile, because the thrust force in each of the gear change stages is inverted during driving and coasting, the relationships of the foregoing thrust forces do not occur during coasting. In general, the transmission torque during coast is ⅓ to ⅕ of that during driving. As a result, the thrust force is extremely small. From the viewpoint of a bearing load, the value of the thrust force becomes so small the value can be ignored in comparison with the thrust force obtained during driving. Therefore, as described previously, a relationship in thrust forces during driving has significant meaning in ensuring durability of bearings.

In addition, in the embodiment, reduction of the thrust force applied to the first bearing 31 of the above bearings is particularly emphasized because the bearing 31 is disposed between a fixed sun gear S1 and a coupling member 12 rotating at a same speed as the input rotation frequency. As a result, its relative rotation speed is high and its bearing load is the greatest. Namely, in simple comparison of the thrust forces shown in FIG. 7, the thrust force applied to the second bearings 32, 33 and the fourth bearing 39 is greater on its low gear change stage side as a result of the thrust force of the first bearing 31 being reduced by application of the invention. However, the second bearings 32, 33 are arranged between rotation members having a small rotational difference. The fourth bearing 39 is arranged between an output member rotating in decelerating manner, due to the gear change, and the case 10. Thus, the bearings 32, 33, 39 have a smaller load than the load of the first bearing 31 in respect to a bearing durability load that depends on both the thrust force and the rotation speed.

Thus, according to the structure of the above first embodiment, during first gear driving in which the driving force is the greatest, and the load due to the thrust force is applied, the thrust forces F1 and F3 of the reduction planetary gear G1 and the planetary gear set G2, respectively, are set so as to face or be opposed to each other. Thus, in a common force transmission route, the thrust force 13 of the sun gear S3 of the planetary gear G2 acts in one direction, and the thrust force F1 of the ring gear R1 of the reduction planetary gear G1 acts in the other direction.

As a result, the differential thrust force F3−F1 is received outside the common force transmission route. Therefore, the durability of the bearing 31 receiving the thrust forces is prevented from being reduced. In addition, the thrust forces F1 and F3 generated, respectively, at the reduction planetary gear G1 and the planetary gear set G2 are directionally opposed to each other, and are buffered by each other, eliminating the need to provide a center support for receiving the thrust forces, and making it possible to reduce the axial dimension of the transmission corresponding directionally.

Further, as described above, the thrust forces are directionally opposed to or face to each other, and are offset, thereby reducing the thrust force applied to the bearing 31 arranged outside of the common force transmission route. Thus, the bearing 31 can be compactly structured, making it possible to reduce the axial dimension of the transmission on this aspect also.

In addition, the thrust bearing 31 abutting against the sun gear S1 of the reduction planetary gear G1 need not be large-scale as a result of the reduction in the above thrust forces. In the case where a structure in which the bearing 31 is abutted against the tooth bottom of the sun gear S1 is adopted, there is no need for increasing the tooth bottom face of the sun gear S1 to ensure an abutting face, making it possible to avoid increasing the radial dimensions of the reduction planetary gear G1. Even in the case where a structure in which the bearing 31 is abutted against the tooth end of the sun gear S1 is adopted, there is no need for thickening a bearing race to ensure rigidity, thus making it possible to prevent an increase in the axial dimension of the force transmission route.

The coupling member 12 is disposed between the reduction planetary gear G1 and the planetary gear set G2, and the bearings 32, 33 are arranged between the coupling member 12 and the sun gear S3. In this manner, the thrust force F3 of the sun gear S3 of the planetary gear set G2 which is greater than the thrust force F1 of the ring gear R1 of the reduction planetary gear G1 is transmitted to the first bearing 31 via the second bearing 32, 33; and the thrust force F1 of the ring gear R1 of the reduction planetary gear G1 is transmitted to the second bearing 32, 33 in opposition to the thrust force F3 of the sun gear S3. Therefore, the resultant thrust force F3−F1 received from the common force transmission route by the first bearing 31 allows the first bearing 31 to be compactly structured.

Further, the long pinion P2 of the planetary gear set G2 of Ravigneaux type meshes with the first sun gear S2 at one end thereof, and the ring gear R3 meshes with the other end of the long pinion P2. Thus, the torsion angle of the sun gear S3 is set so that a direction of the thrust force F3 generated at the sun gear S3 of the planetary gear set G2 faces the direction of the thrust force F1 generated at the ring gear S3 of the planetary gear set G2. As a result, the thrust force F4, different from the thrust force F3 of the sun gear S3, is generated at the ring gear R3 of the planetary gear set G2. As a result, the thrust force F4 acts in a direction in which a moment is offset set during engagement with fifth and sixth gears in which the thrust force departing from the ring gear R3 acts on the sun gear S2. Therefore, a load applied to the support portion of the long pinion P2 can be reduced.

Figure 8:
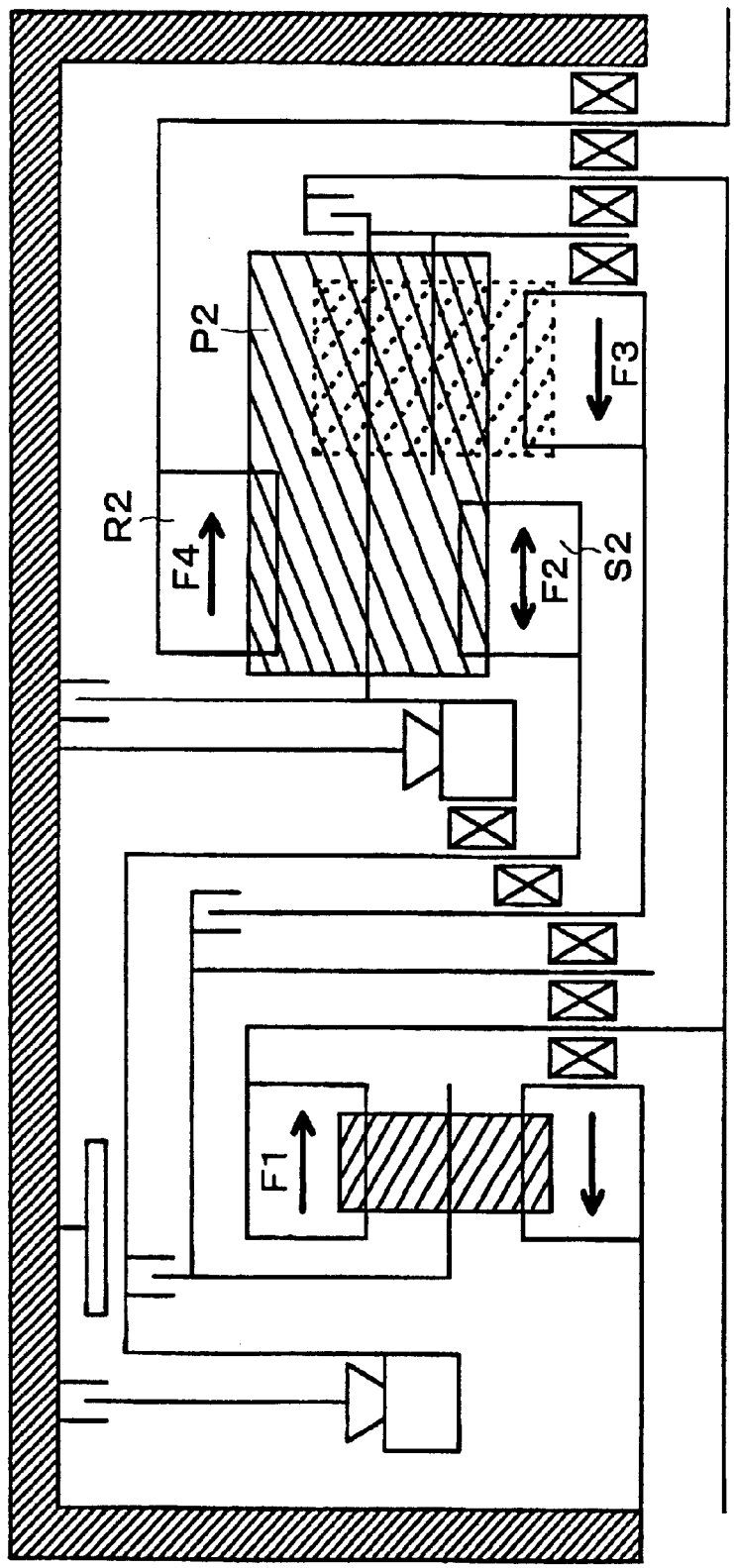
FIG. 8 is a schematic cross-sectional view showing a gear train according to a second embodiment.

In the meantime, in the embodiment, with respect to the structure of the planetary gear set G2, the ring gear R2/R3 is arranged so as to be geared with the long pinion P2 on the outer circumference side of the sun gear S3, and the ring gear R2/R3 can also be disposed so as to be geared with the long pinion P2 on the outer circumference side of the sun gear S2. FIG. 8 is a schematic view showing a gear train adopting such an arrangement according to the second embodiment. Even if such a structure is adopted, a relationship in thrust forces is naturally met in the same manner as in the case of the first embodiment, and a similar effect can be obtained.

Figure 9:
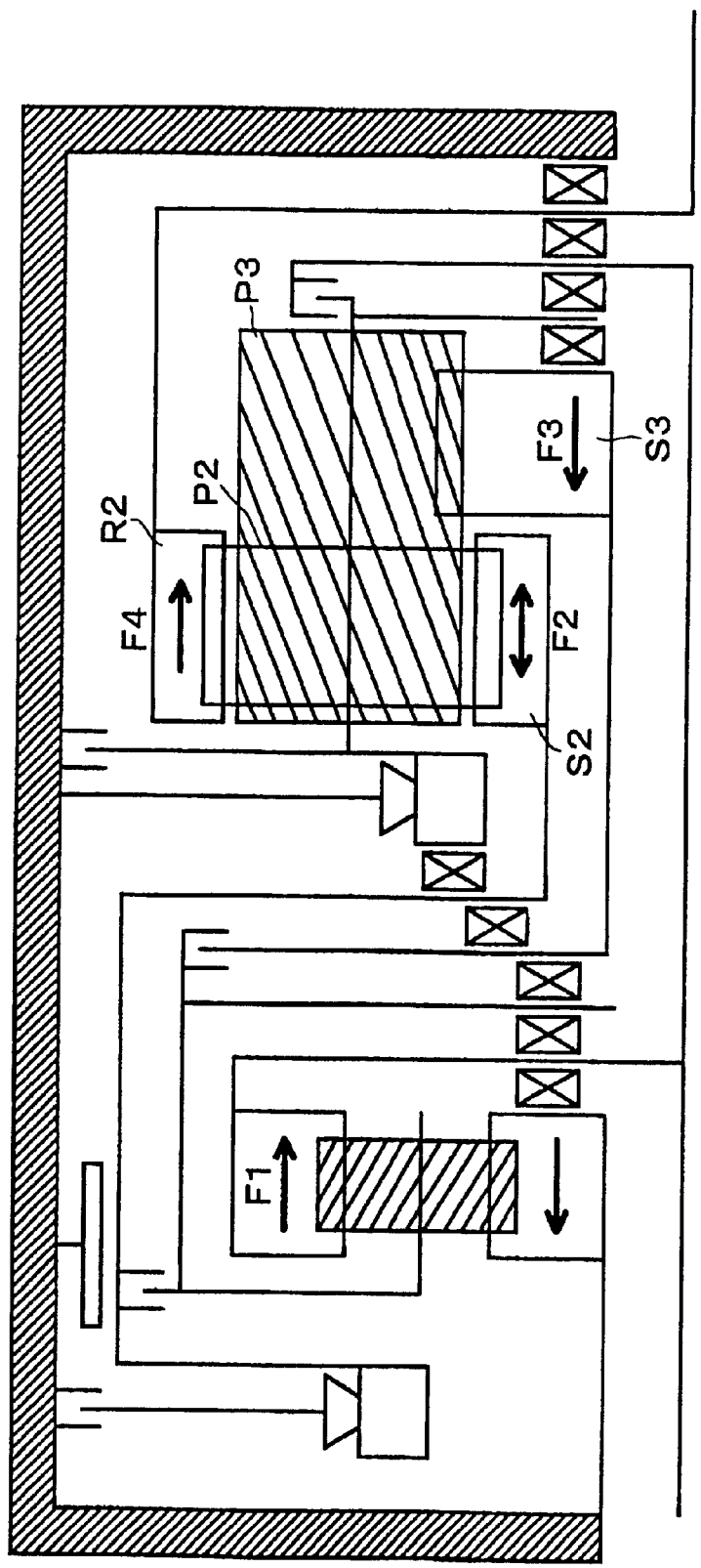
FIG. 9 is a schematic cross-sectional view showing a gear train according to a third embodiment.

Next, FIG. 9 is a schematic cross-sectional view showing a third embodiment in which, with respect to the structure of the planetary gear set G2, a relationship between the first sun gear S2 and the second sun gear S3 is reversed in scale in the second embodiment; a short pinion P2 meshes with the sun gear S2 having a small diameter in this embodiment and the ring gear R2; and a long pinion P3 meshes with the sun gear S3 having a large diameter. In this case, generation of a rotation moment in the long pinion P3 can be prevented and, thus, a load applied to its rotation support portion can be reduced. Even if such a structure is adopted, a relationship in thrust forces is naturally met in the same manner as that in the first and second embodiments, and a similar effect can be obtained.

Figure 10:
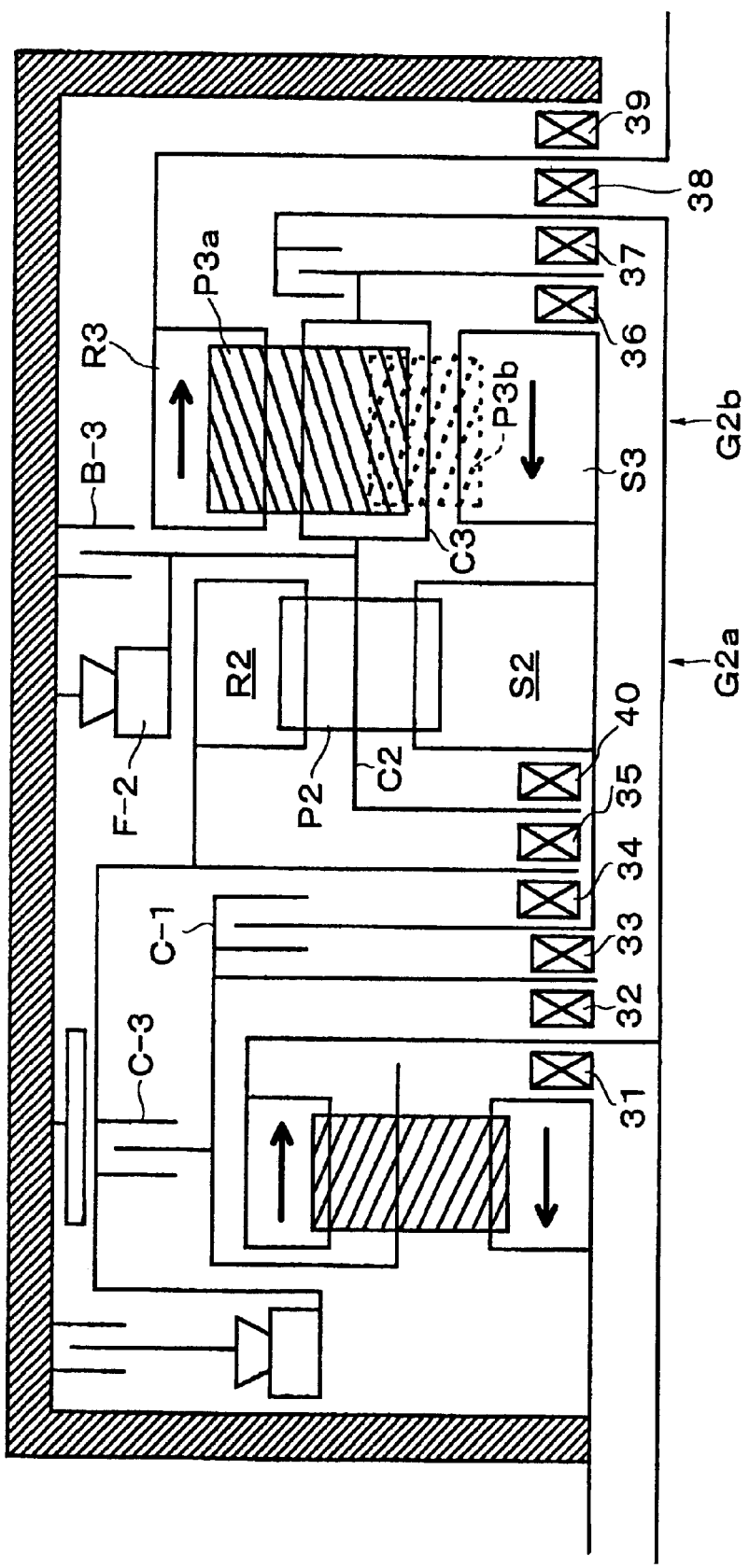
FIG. 10 is a schematic cross-sectional view showing a gear train according to a fourth embodiment.

In each of the foregoing embodiments, although the planetary gear set G2 of Ravigneaux type is employed, the basic concept of the invention is applicable to a planetary gear set in which two general planetary gears are combined with each other. As such an example, FIG. 10 is a schematic cross-sectional view showing a structure in which a simple planetary gear G2a and a double planetary gear G2b are combined with each other according to the fourth embodiment.

In the embodiment, as is the case in which a planetary gear set of Ravigneaux type is employed, in order to improve a speed ratio and a speed stage obtained for each gear change stage, the sun gear S2 having a large diameter and sun gear S3 having a small diameter of the each other by being mutually transmitted via the member 14 of the ring gear R3 and the output shaft 19, the third bearings 36, 37 in the force transmission route and a fourth bearing 38 and, thus, the thrust forces are not applied to other bearings in the force transmission route. Therefore, during the first gear (1st) driving, the thrust forces generated at the reduction planetary gear G1 and the planetary gear G2 are not transmitted to the case 10. Moreover, no thrust forces (F1 and F3) act in the common force transmission route. planetary gears G2a, G2b, respectively, are connected with each other, which constitutes an input element of reduction rotation via clutch C-1, and the ring gear R2 of the simple planetary gear G2a is formed as an input element of reduction rotation via clutch C-3. In addition, with respect to the double planetary gear G2b, torsion of the helical teeth is set to the pinion P3a on the side geared with the ring gear R2/R3 in the manner similar to that in the previous embodiments. In the case of this structure, the ring gear R2/R3 is coupled with clutch C-3 to form an input element for reduction rotation and, thus, a coupling portion between the carrier C2 of the pinion P2 and the carrier C3 of the double pinions P3a, P3b is coupled with brake B-3 and one-way clutch F-2, and one end of the carrier C2 is supported by the extension of both sun gears S2, S3. In this relationship, a bearing 40 is added.

Figure 11:
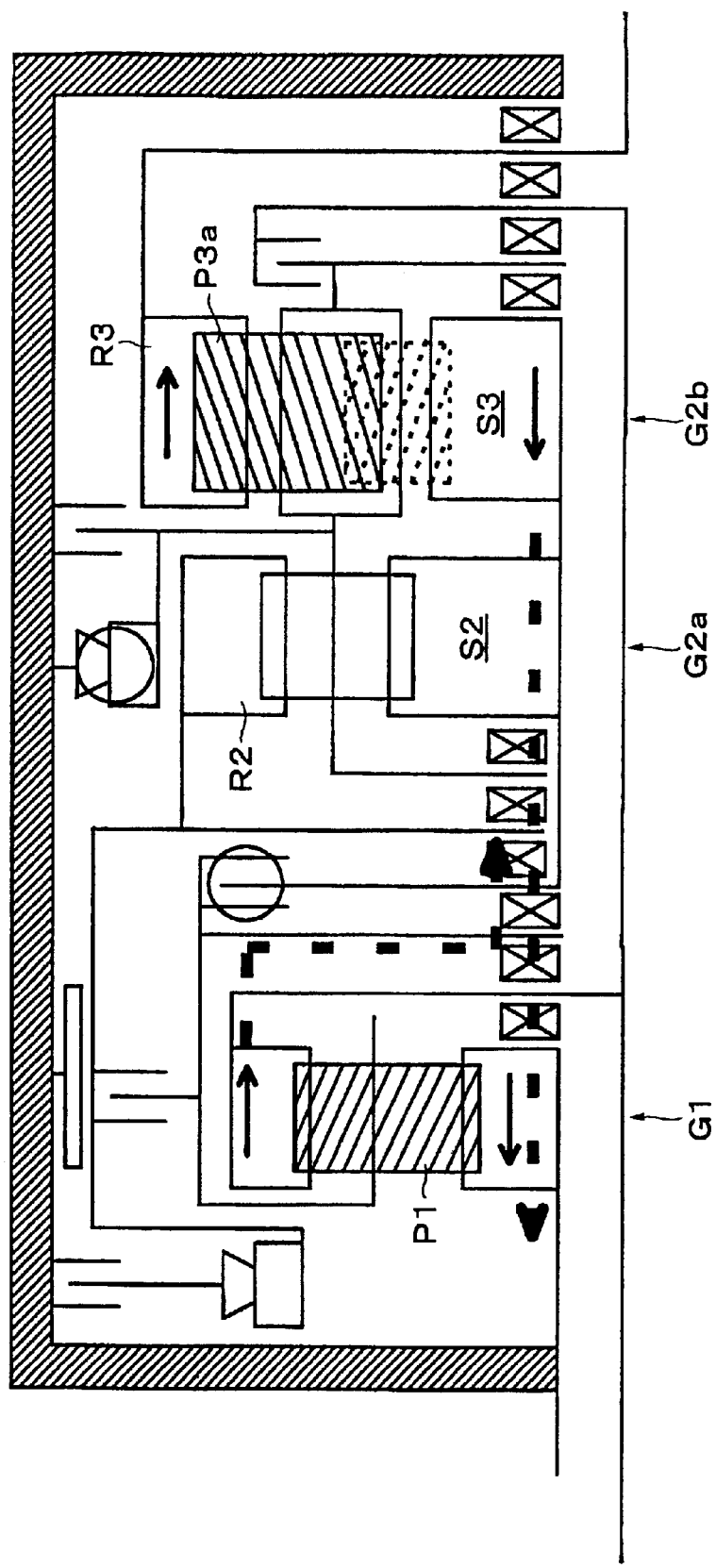
FIG. 11 is a schematic cross-sectional view showing a thrust force during first gear driving in the fourth embodiment.

When such a combined planetary gear set G2 is employed, both of the sun gears S2, S3 are coupled with each other, and each of the bearings 32, 33 is arranged to be in a common force transmission route. A relationship in thrust forces during first gear driving is similar to a case in each of the preceding embodiments. Namely, FIG. 11 shows a thrust force during first gear in which the bearing load is the greatest. The torsion of the helical teeth of the pinion P1 of the reduction planetary gear G1 and the torsion direction of the helical teeth of the pinion P3a, geared with the ring gear R3 side of the double planetary gear G2b, are set in a direction similar to the case of each of the preceding embodiments, thereby making it possible to support a thrust force in the same manner as indicated by thick dotted line in the figure.

Each of the above mentioned embodiments is targeted to primarily reduce a load applied to a bearing by producing thrust forces that are opposite to one another by providing the torsion directions of the helical teeth angled different from (opposed to or opposite to) each other. The above directions are different from (opposed to or opposite to) each other and depart from (or are opposite to) one another. As a result, they can be primarily used to reduce the load transmitted to a case. Next, a further embodiment based on this concept will be described.

Figure 12:
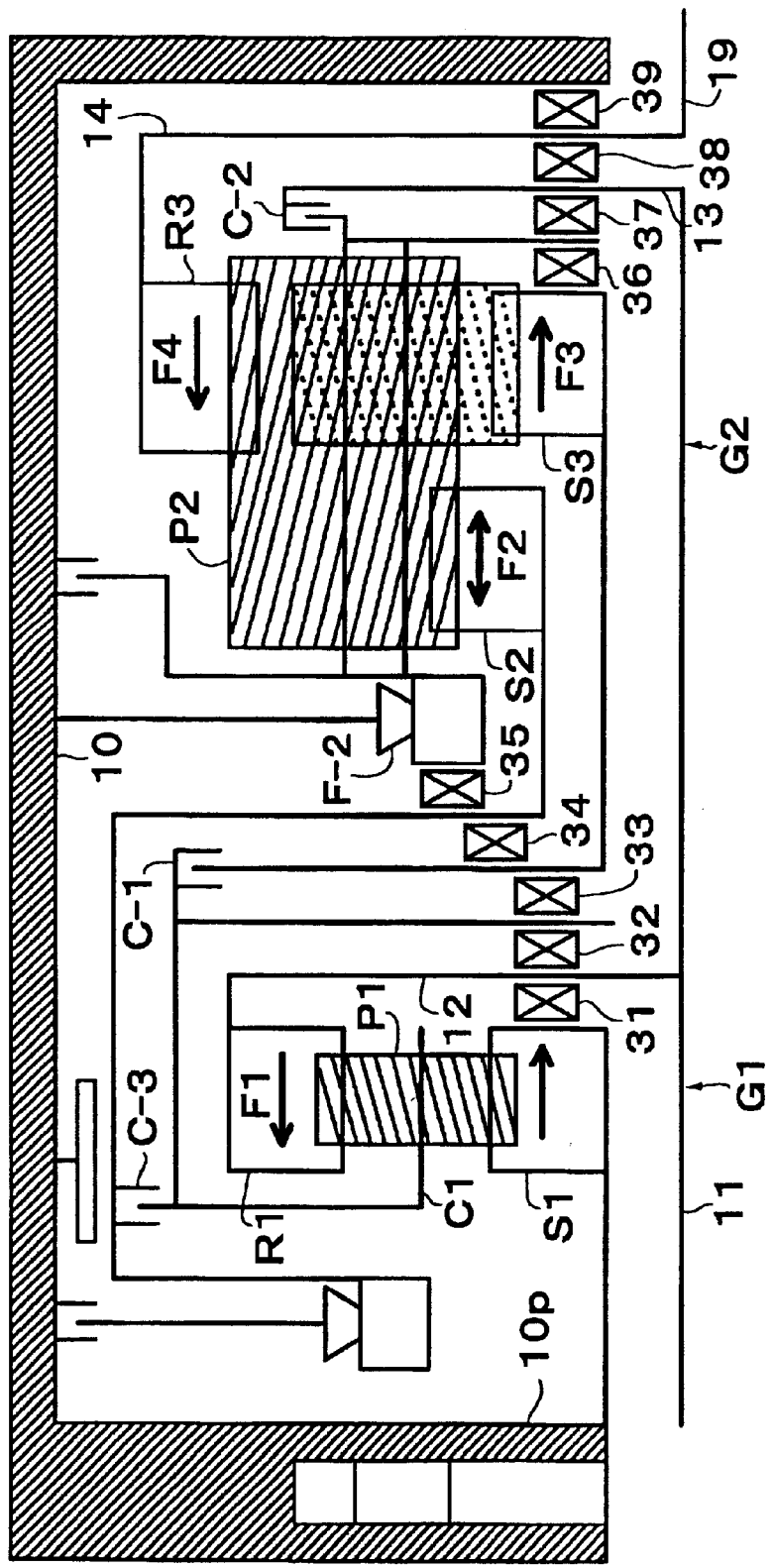
FIG. 12 is a schematic cross-sectional view showing a gear train according to the fifth embodiment.

FIG. 12 is a schematic cross-sectional view showing the structure of a gear train according to a fifth embodiment. In the embodiment, the rotational direction of the input shaft 11 is clockwise as viewed from its front end. The rotational direction is mutually opposite to the torsion direction of the helical teeth shown in FIG. 4, the first embodiment. The torsion direction of the helical teeth of the pinion P1 of the reduction planetary gear G1 is turned counterclockwise, and the torsion direction of the helical teeth of the long pinion P2 of the planetary gear set G2 is turned in the clockwise direction. Naturally, the torsion direction of the helical teeth of another element geared with these teeth is in a direction suitable to such torsion.

Figure 13:
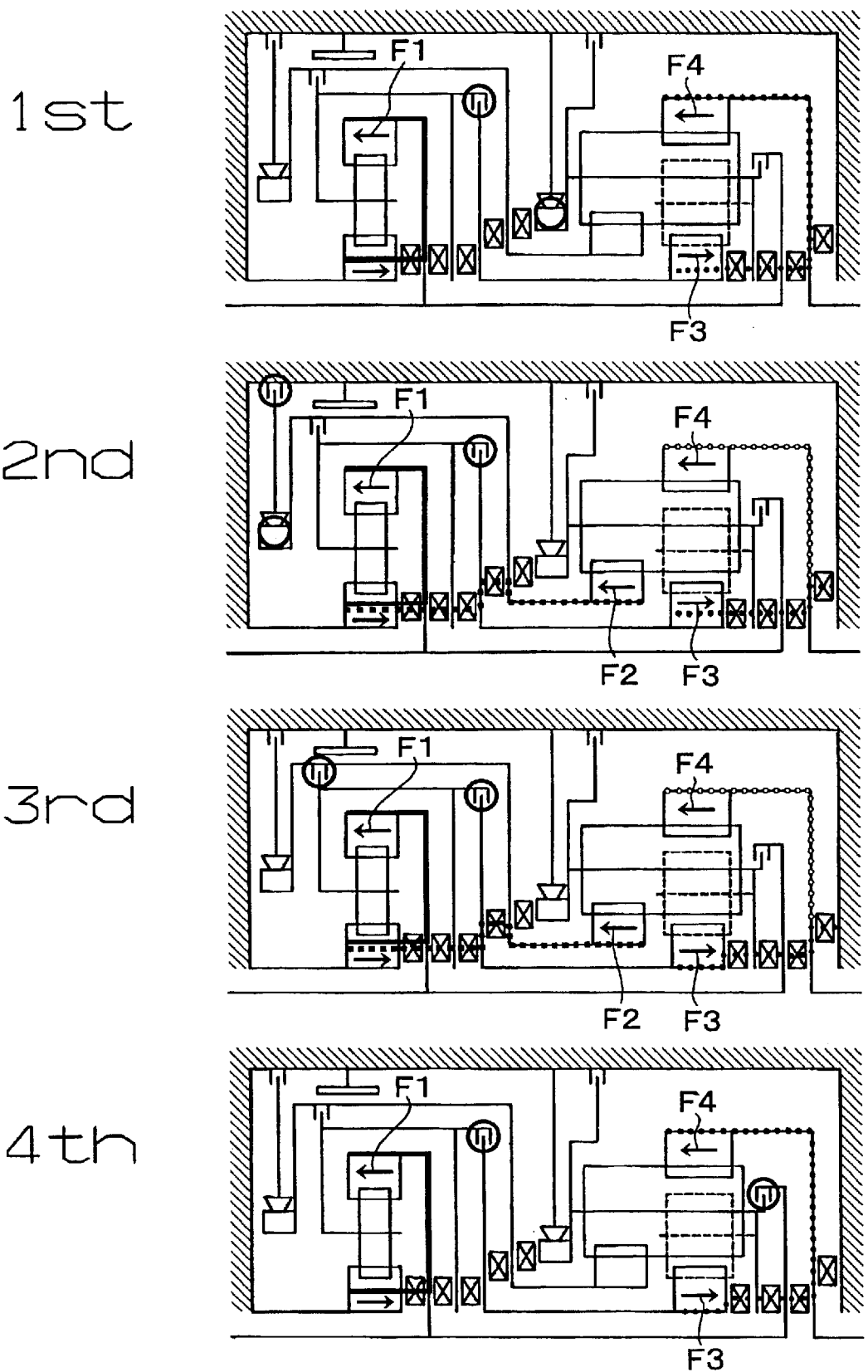
FIG. 13 is a schematic cross-sectional view showing the thrust force when the driving force of the gear train according to the fifth embodiment is transmitted for each of the first to fourth gear change stages.
Figure 14:
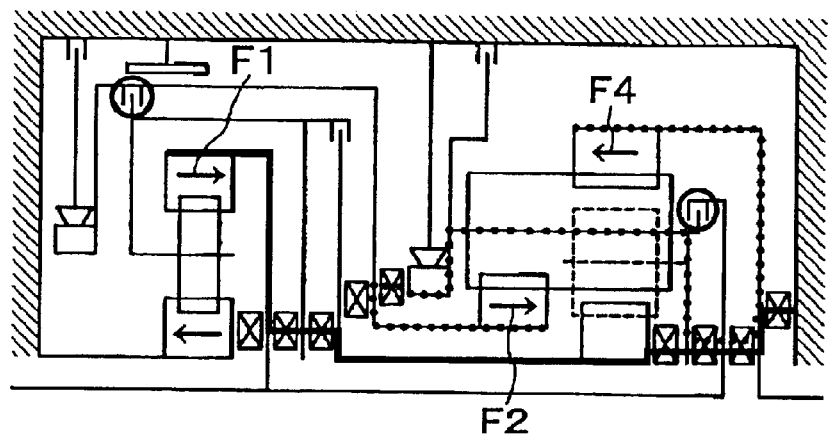
FIG. 14 is a schematic cross-sectional view showing the thrust force for fifth, sixth, and reverse gears.
Figure 14:
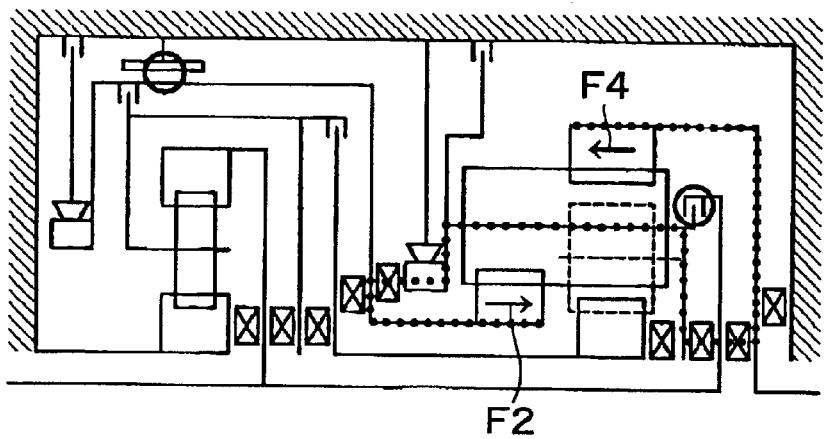
Figure 14:
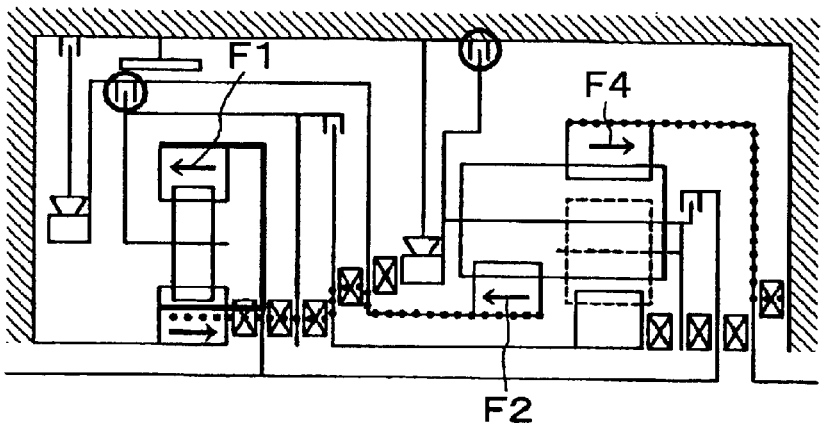

FIGS. 13 and 14 are schematic cross-sectional views showing a change in thrust force in each gear change stage when the above relational torsion is set. Referring to FIG. 13 (refer to FIG. 12 for reference numbers designating each member), during first gear (1st) driving, the forward thrust force F1 (indicated by the left-pointing arrow in the figure) acts on the ring gear R1 in the reduction planetary gear G1 in accordance with the relationship of the torsion direction resulting from the above mentioned helical teeth. In contrast, a similar backward thrust force (undesignated) (indicated by the right-pointing direction arrow in the figure) acts on the sun gear S1. The thrust forces are balanced with each other by being mutually transmitted via the coupling member 12 and the first bearing 31 in the force transmission route. Thus, the thrust forces do not act on other bearings in the force transmission route or an oil pump case 10p constituting a front wall of the case 10. On the other hand, in the planetary gear set G2, the rearward thrust force F4 (indicated by a right pointing arrow in the figure) acts on the second sun gear S3 having a small diameter, and the similar forward thrust force F4 (indicated by the left-pointing arrow in the figure) acts on the ring gear R3. The thrust forces are balanced with each other by being mutually transmitted via the coupling member 14 of the ring gear R3 and the output shaft 19, the third bearings 36, 37 in the force transmission route and a fourth bearing 38 and, thus, the thrust forces are not applied to other bearings in the force transmission route. Therefore, during first gear (1st) driving, the thrust forces generated at the reduction planetary gear G1 and the planetary gear G2 are not transmitted to the case 10. Moreover, no thrust forces (F1 and P3) act in the common force transmission route.

FIG. 15 is a table showing the thrust force applied to each bearing during driving at each gear change stage (the numeric values in the table are obtained under the same conditions as those of FIG. 7). As seen in the table, the thrust force F1 applied to the first bearing 31 is significantly reduced more than in the case of the first embodiment and, moreover, the force is not transmitted to the front wall of the case 10. In general, the invention is structured with an oil pump case 10p, thereby making it possible to eliminate a load on the rigidly disadvantageous case front wall in comparison with another wall. On the other hand, the thrust force F3 of the planetary gear set G2 is applied intact to the third bearings 36, 37 and the fourth bearing 38 on one side. However, as described previously, these bearings are small bearings in relative rotational difference, and thus the bearing load is reduced.

Next, during the second gear (2nd) driving, the first sun gear S2 shares a reaction force torque for power transmission for the reasons stated in the power transmission of the first embodiment and, thus, the thrust force F2 acts thereto. The thrust force is transmitted to the coupling member 12 via the bearing 34 and the second bearings 33, 32. As a result, an imbalanced force is generated on the reduction planetary gear G1 side which is in balance during first gear. The force is loaded on the front wall of the case 10 via the first bearing 31 and the sun gear S1, but the force is found to be small as shown in FIG. 15. In this case, the thrust force applied to the first bearing 31 is equal to F1+F2. On the other hand, on the planetary gear set G2 side, the thrust force F4 of the ring gear R3 is smaller than the thrust force F3 of the small-diameter sun gear S3 by the torque of the large-diameter sun gear S3 and, thus, an imbalanced force is generated and transmitted to the case back wall via a fourth bearing 39 on one side. Naturally, the force is equal to a force applied to the case front wall. In this case, the thrust forces applied to the other three bearings 36, 37, 38 are equal to each other during first gear driving.

During third gear (3rd) driving, power transmission differs only in that the large-diameter sun gear S2 is rotating in response to the second gear. There is no particular difference in torque sharing of the elements associated with torque transmission. Thus, as is evident by referring to FIG. 15, a relationship in the thrust forces is the same as that during the second gear driving except that the value is reduced by a decrease in the torque amplification rate due to the decrease in reduction ratio.

Further, power transmission during fourth gear (4th) driving is performed in a state in which torque transmission from the large-diameter sun gear S2 to the third gear is eliminated. Therefore, in this case, the relationship in the thrust forces becomes a closed loop in the same manner during first gear driving between the reduction planetary gear G1 and planetary gear set G2. There is no force transmission to the case 10, and the thrust force applied to each of the bearings 31, 36, 37, 38 is reduced due to the decrease in the torque amplification rate.

Next, during fifth gear (5th) driving shown in FIG. 14, as stated in describing the power transmission of the first embodiment, power transmission is apparently different from that during any other gear driving. The large-diameter sun gear S2 enters a state in which the sun gear S2 applies a driving torque to the ring gear R3 via the long pinion P2. As a result, the thrust force F2 applied to the large-diameter sun gear S2 is opposite to that applied during third gear driving, and this thrust force F2 is transmitted to the ring gear R3 through the bearing 35, an inner race of the one-way clutch, carrier C2, the bearings 37, 38, and the output coupling member 14 via the force transmission route marked with the mark ● in the figure, and is balanced with the opposite thrust force F4 of the ring gear R3. Therefore, the thrust force on the planetary gear set G2 side becomes a closed loop, free of being externally affected by an imbalanced force. In contrast, on the reduction planetary gear G1 side, the thrust force of the ring gear R1 and the sun gear S1 is directionally opposite to that during first to fourth gear driving. Thus, the thrust force F1 of the ring gear R1 is transmitted to the case back wall through the second bearings 32, 33, the small-diameter sun gear S3, and the third and fourth bearings 36, 37, and 38, 39. Therefore, the thrust force F1 is loaded on the front and back walls of the case 10. However, in this gear change stage, the transmission torque is small due to acceleration. As is evident by referring to FIG. 15, the thrust force F1 itself is extremely small in comparison with that during the second or third gear driving and, thus, a load applied to the case is smaller than that during the earlier gear change stages together with a bearing load.

During the sixth gear (6th) driving, in power transmission, torque transmission is eliminated on the reduction planetary gear G1 side and, thus, the thrust force to the fifth gear driving due to the sun gear S1 and the ring gear R1 is eliminated. The thrust force on the planetary gear set G2 side is balanced and, thus, the load applied to the case is eliminated.

On the other hand, during reverse (Rev) driving, an output of the ring gear R3 is inverted in response to a input of the large-diameter sun gear S2, and the thrust force F4 of the ring gear R3 is separated from the thrust force F2 of the large-diameter sun gear S2. In this case, the thrust force F4 of the ring gear R3 is transmitted from the output coupling member 14 to the case back wall through the bearing 39. In addition, the thrust force F2 of the large-diameter sun gear S2 is transmitted to the front wall of the case 10 through the sun gear S1 via the four front side bearings 34 to 31. The thrust force F1 on the reduction planetary gear G1 side is well-balanced between the sun gear S1 and the ring gear R1. Therefore, during reverse driving deriving, the thrust force F4=F2 is transmitted to both the front and back walls of the case 10. In this case, the bearings 31, 39 receive a relatively large thrust force between the case 10 and each of the coupling members 12, 14. The bearing 39 is present on the reduction rotation side. Thus, a relative difference in rotation frequency is large, and the bearing load is increased more significantly than during driving in any other gear change stage. Therefore, the bearing 31 is require to have a capability suitable for reverse driving. In a vehicle's travels, reverse driving is generated for a very short time. Thus, it is not necessary to ensure a remarkably large capability to ensure the durability of bearing 31.

Figure 16:
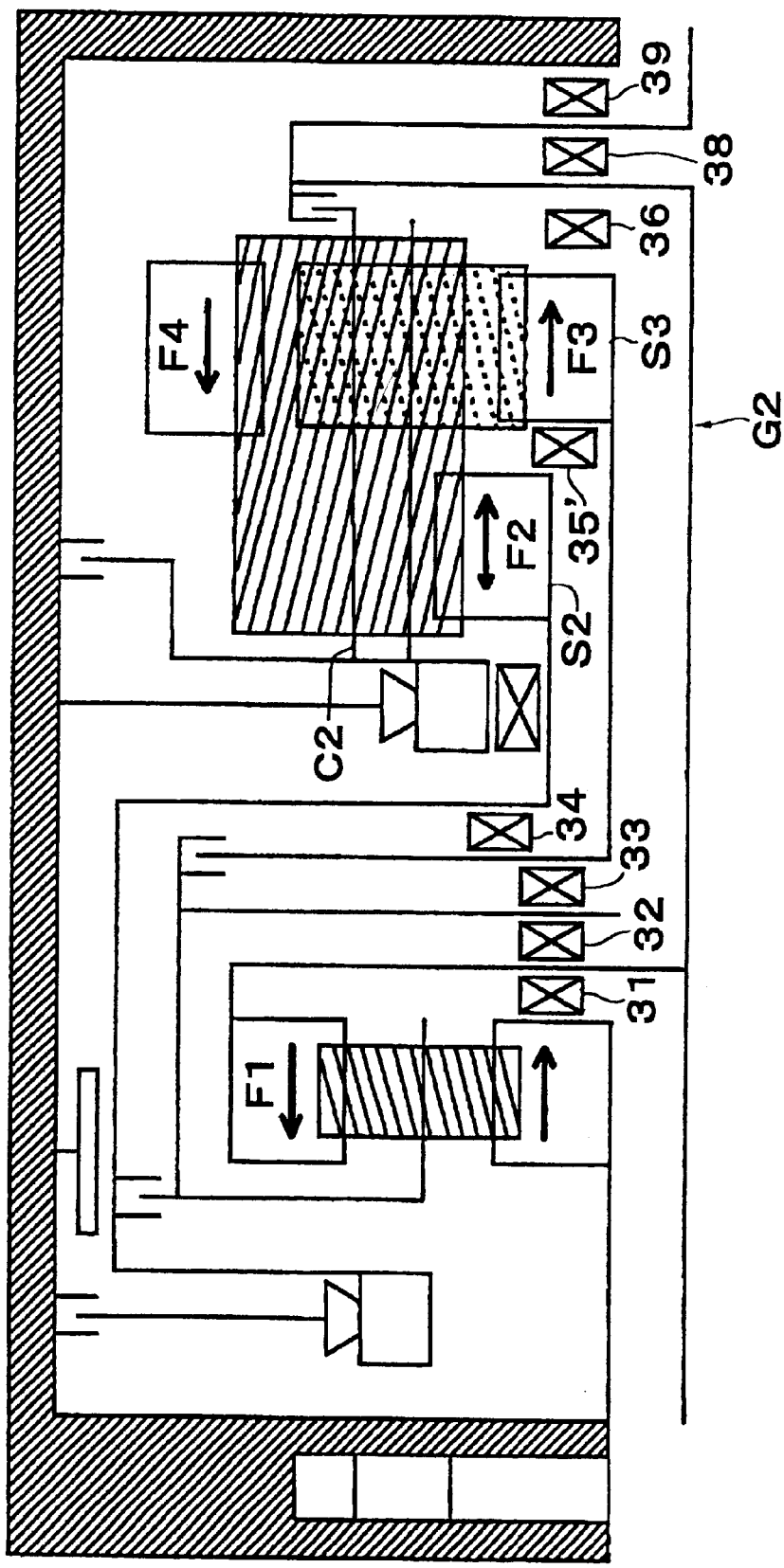
FIG. 16 is a schematic cross-sectional view showing a gear train according to the sixth embodiment.

Next, FIG. 16 is a schematic cross-sectional view showing a changed thrust bearing arrangement according to a sixth embodiment relative to the fifth embodiment. The sixth embodiment is intended to reduce the number of bearings. In the fifth embodiment, there was adopted a structure in which the bearing 35 is disposed between one-way clutch F-2 and the extension of the sun gear S2. In this embodiment, a bearing 35' is disposed between the sun gears S2, S3 of the planetary gear set G2. With this structure, the backward thrust force generated at the large-diameter diameter sun gear S2 can be transmitted directly to the small-diameter sun gear S3 via the bearing 35'. Thus, unlike conventional thrust force transmission via the carrier C2, a bearing 37 necessary to transmit the thrust force backward from the carrier C2 can be eliminated and, thus, the number of bearings is reduced correspondingly.

In each of the above mentioned embodiments, the invention is embodied as a longitudinal type transmission used for a FR vehicle. Thus, the adopted bearing arrangements presume an arrangement in which a support wall, which would cause an increase in the axial length, is not provided. In the case where the scope of the invention is embodied in the form of a lateral type transmission used for a front engine/front drive (FF) vehicle or a rear engine/rear drive (RR) vehicle, a support for supporting an output gear in a general change gear mechanism is required for parallel-shaft output; and a structure in which the number of bearings is further reduced can be adopted. Hereinafter, the embodiments of this form will be explained.

Figure 17:
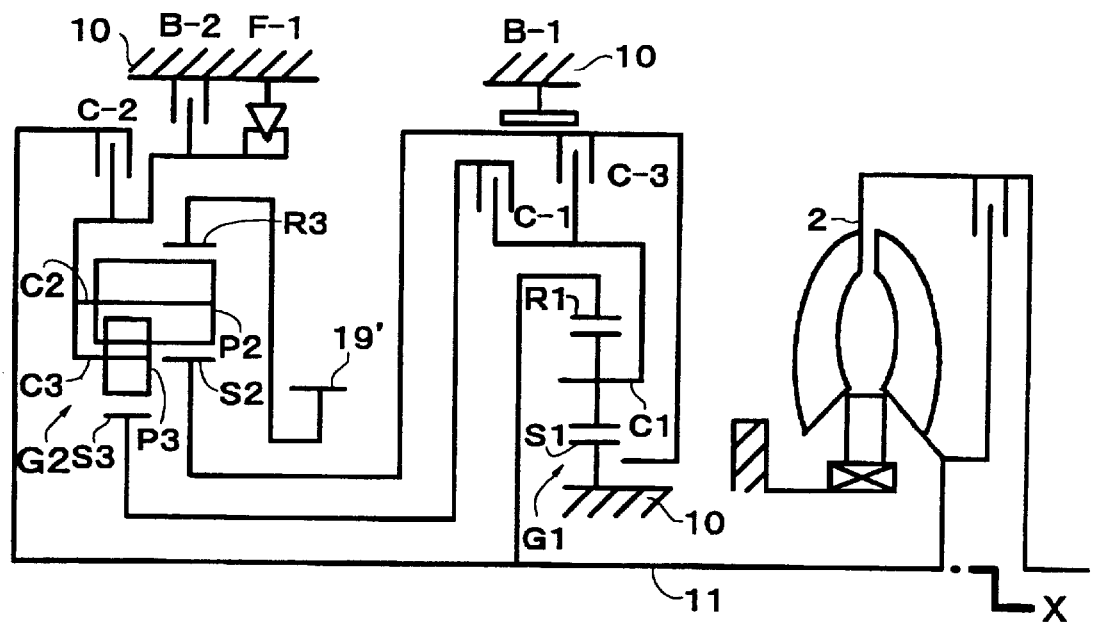
FIG. 17 is a skeleton view showing an automatic transmission according to the seventh embodiment of the invention.
Figure 17:
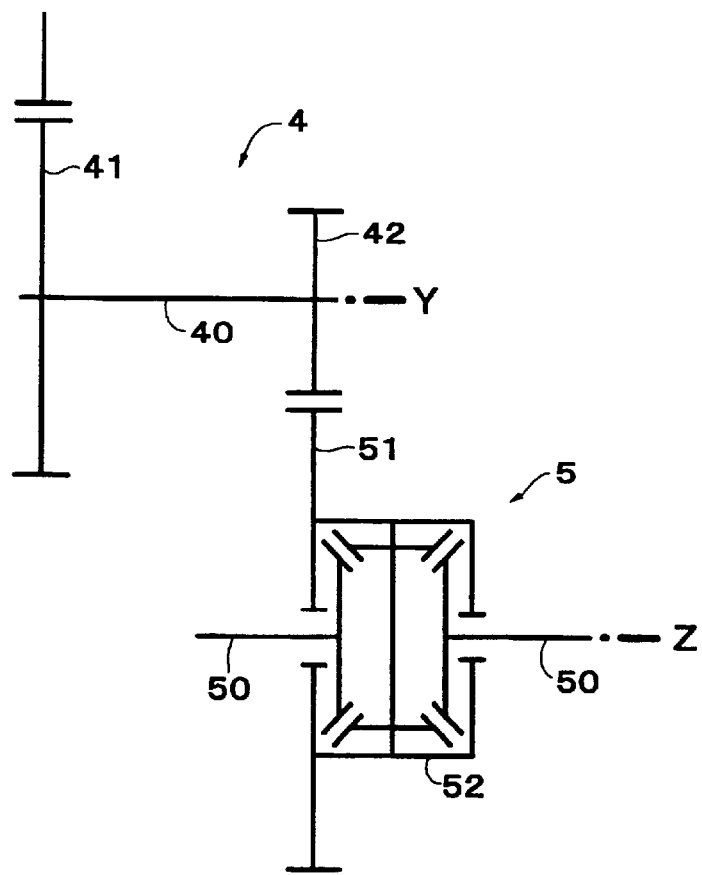
Figures 18, 19:
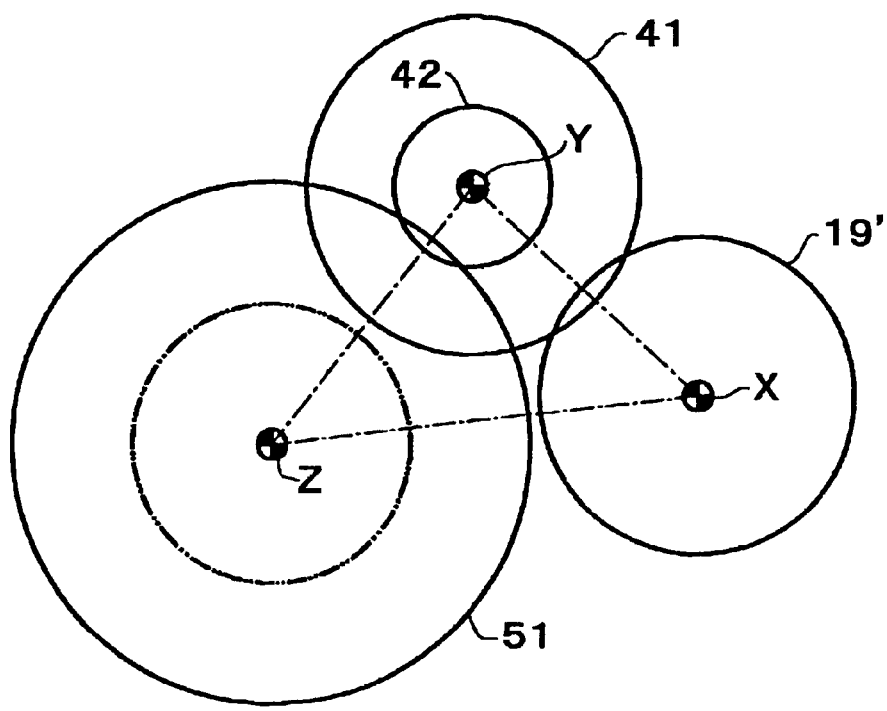
FIG. 18 is a layout showing an actual axial position relationship of the automatic transmission.
FIG. 19 is an operational table showing the gear train according to the seventh embodiment.

FIGS. 17 to 23 show a form of a three-shaft structured trans-axle according to a seventh embodiment. FIG. 17 is an exploded, skeleton representation of the shafts and the transmission. FIG. 18 shows the shaft arrangement as viewed in an axial direction. In such a transmission, there is adopted a three-shaft shaft structure in which each element is arranged on a one of the shafts, i.e., main shaft X, counter shaft Y, and differential shaft Z arranged in parallel to each other. A change gear mechanism, including a torque converter 2 and a gear train, structured substantially similar to the sixth embodiment is arranged on the main shaft X; a counter gear mechanism 4 compatible with a reduction mechanism is arranged on the counter shaft Y; and a differential device 5 is arranged on the differential shaft Z. In the illustrative embodiment, a parallel shaft output member on the main shaft X is a counter drive gear 19' to be coupled with the ring gear R3 as an output element of the planetary gear set G2. In addition, because the space in the vehicle constrains the axial length of the transmission, which in this case is a lateral transmission, the only engagement element for locking the large-diameter first sun gear S2 is band brake B-1. Therefore, the designation of brake B-2 and one-way clutch F-1 are raised, but correspond to brake B-3 and one-way clutch F-2 in each of the foregoing embodiments.

The counter gear mechanism 4 on the counter shaft Y is provided with a large-diameter counter driven gear 41 fixed to a counter shaft 40 and geared with the counter drive gear 19' as an output member on the main shaft X. A small-diameter differential drive pinion gear 42 is fixed to the counter shaft 40 as an output element of the counter shaft Y. In this manner, an output from the main shaft X side is decelerated on a parallel shaft, is inverted, and is transmitted to the differential device 5, thereby obtaining an appropriate final reduction ratio and serving as a function for aligning a rotational direction of the input shaft 11 and a rotational direction of an output of the differential device 5. The differential device 5 on the differential shaft Z meshes a differential ring gear 51 fixed to a differential case 52 with the differential pinion gear 42 and couples it with the counter shaft 40. A differential rotation of a differential gear arranged in the differential case 52 is outputted to a horizontal axis 50, and this output is provided as a final wheel driving force.

In the automatic transmission, as shown in FIG. 19, which is an engagement diagram, engagement and release of each clutch and brake (engagement is marked with the mark ○ and disengagement is shown as a blank) and a relationship between change gear stages achieved thereby are similar to the case of each of the foregoing embodiments (however, as described previously, brake B-2 and one-way clutch F-1 correspond to brake B-3 and one-way clutch F-2 according to each of the previously discussed embodiments). In the figure, the ○ in parenthesis designates engagement during engine braking.

Figure 20:
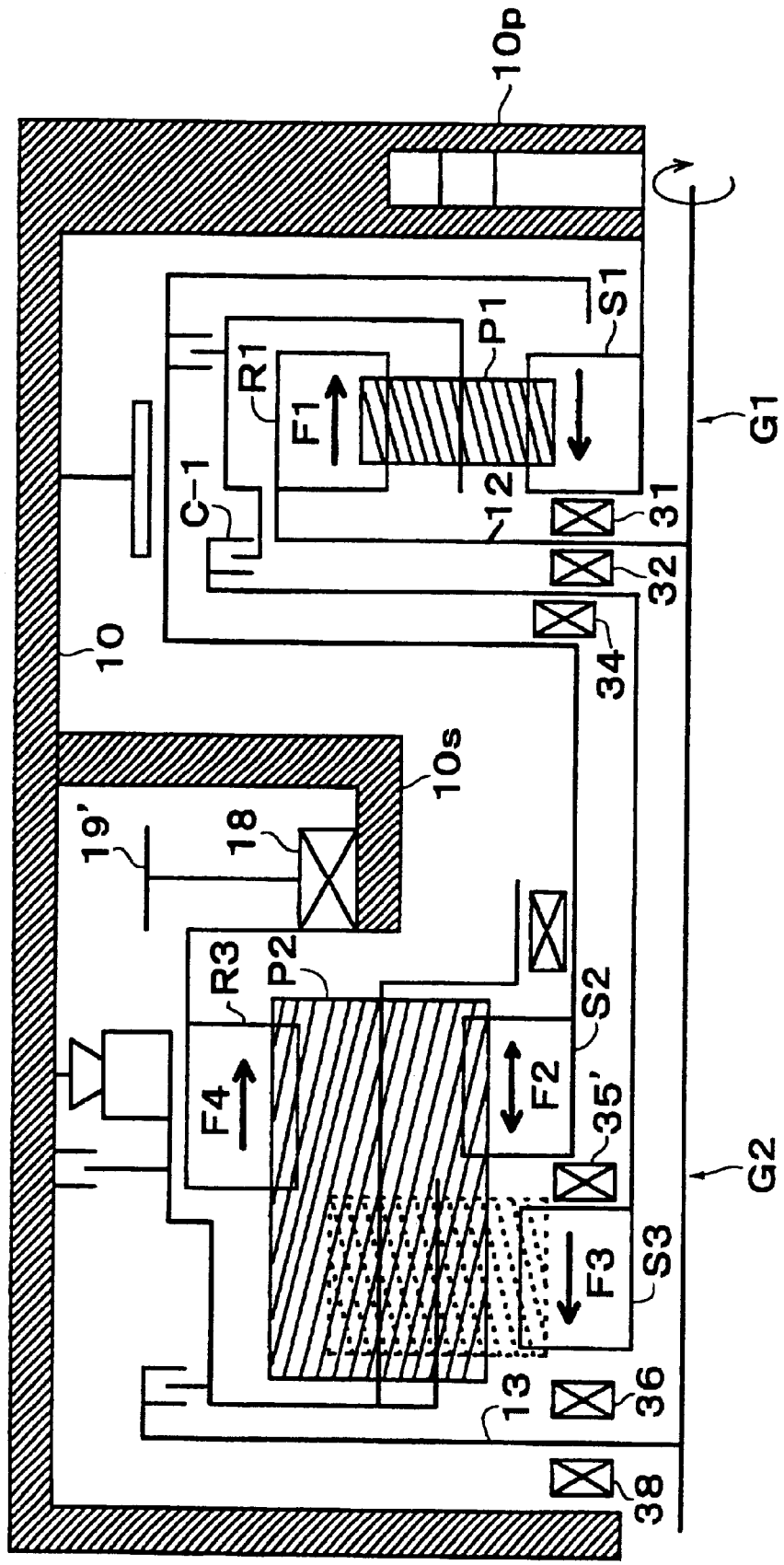
FIG. 20 is a schematic cross-sectional view showing the gear train according to the seventh embodiment in more detail.

FIG. 20 is a schematic cross-sectional view showing only the change gear mechanism on the main shaft X. In the change gear mechanism, when viewed from a torque converter side (right side as shown), the input shaft 11 rotates clockwise, the pinion P1 of the reduction planetary gear G1 is provided with torsion in a counterclockwise direction, and the long pinion P2 of the planetary gear set G2 is provided with torsion in a clockwise direction. The change gear mechanism is different from that according to each of the previously discussed embodiments in that a support wall 10s is fixed to, or integrated with, the case 10. The counter drive gear 19' is supported on the support wall 10s via a radial ball bearing 18 capable of supporting thrust force.

With each bearing of the force transmission route, a first bearing 31 is arranged between the sun gear S1 of the reduction planetary gear G1 and a coupling member 12 for coupling the ring gear R1 with the input shaft 11; a second bearing 32 is arranged between the coupling member 12 and an extension of the small-diameter sun gear S3 of the planetary gear set G2; the other second bearing 34 is arranged between an extension of the small diameter sun gear S3 and an extension of the large-diameter sun gear S2; a bearing 35' is arranged between the sun gears S2, S3; a third bearing 36 is further arranged between the small-diameter sun gear S3 and the other coupling member 13; and a fourth bearing 38 is arranged between the other coupling member 13 and a case 10 left wall, respectively.

Figure 21:
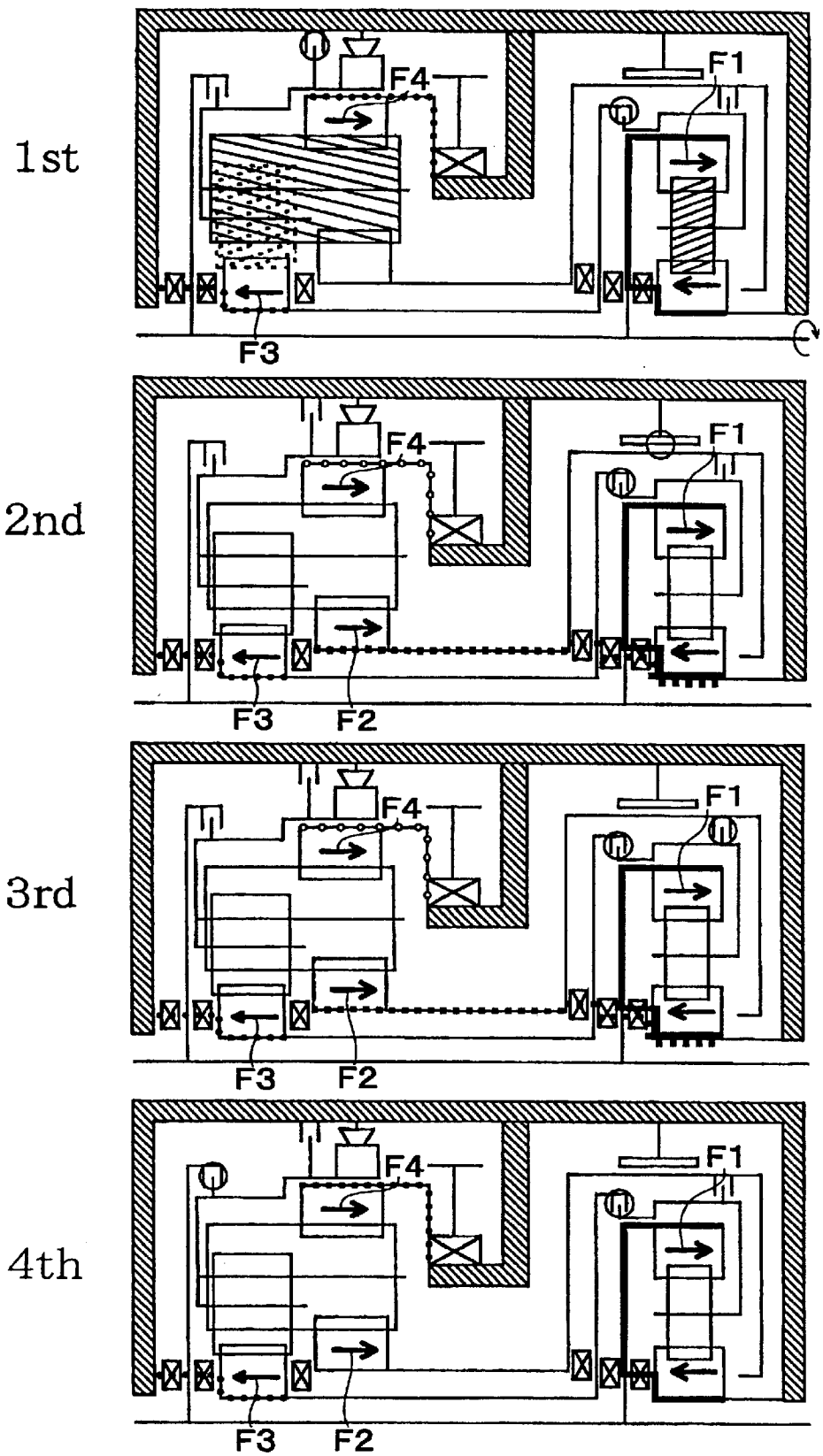
FIG. 21 is a schematic cross-sectional view showing the thrust force when the driving force of the gear train according to the seventh embodiment is transmitted for each of the first to fourth gear change stages.
Figure 22:
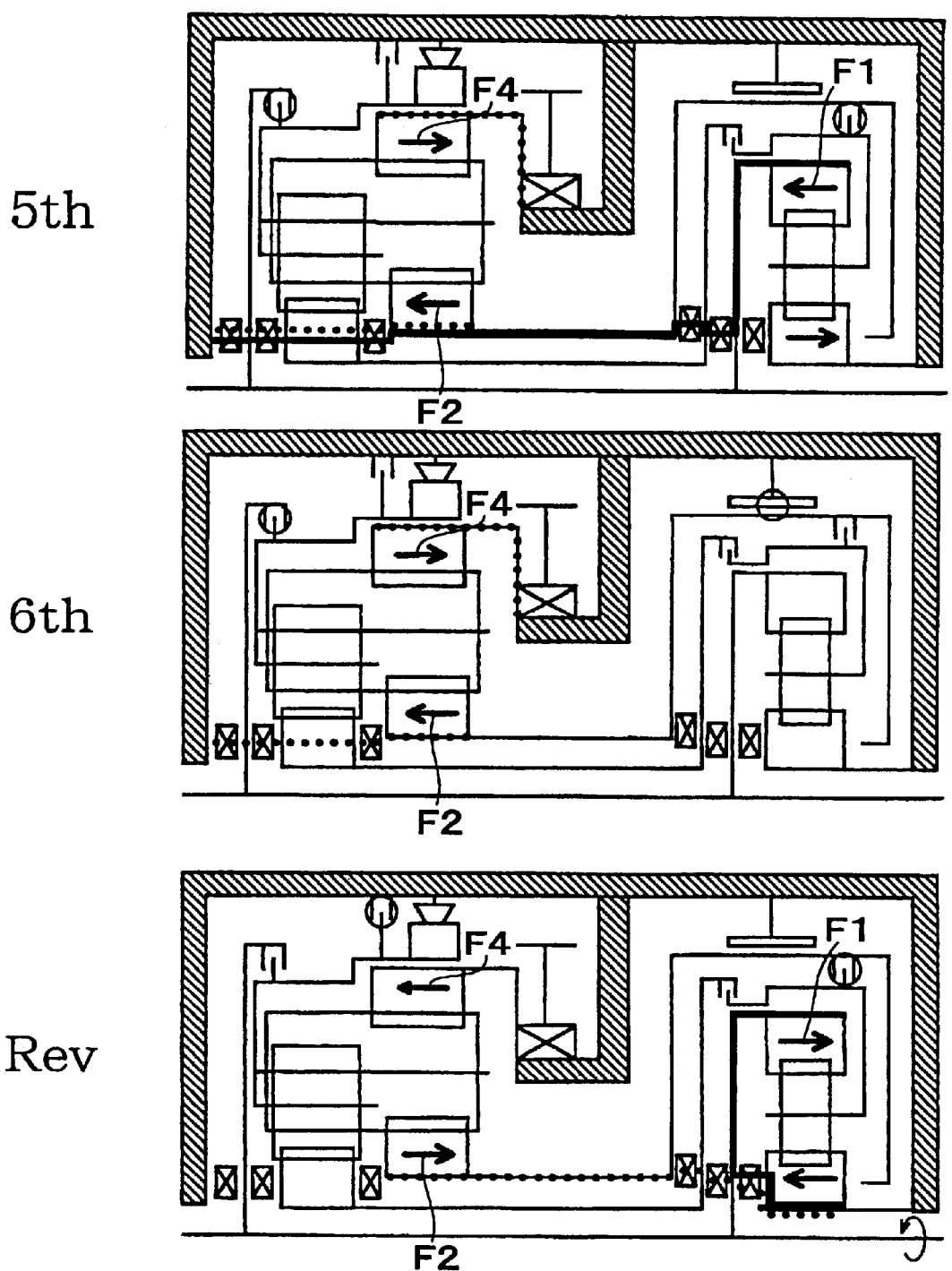
FIG. 22 is a schematic cross-sectional view showing the thrust force for fifth, sixth, and reverse gears.

FIGS. 21 and 22 are schematic cross-sectional views showing changes in the thrust force in each gear change stage when torsion in the above relationship is set. Referring to FIG. 21 (refer to FIG. 20 for the reference numerals designating each member), during first gear (1st) driving, in the reduction planetary gear G1, the thrust force F1 in the right direction as indicated acts on the ring gear R1 based on a relationship of the torsion direction of the helical teeth. In contrast, the equal thrust force in the left direction as indicated acts on the sun gear S1. The thrust forces are mutually transmitted via the bearing 31 in the force transmission route and are balanced. Thus, a thrust force does not act on an oil pump cover 10p as another bearing or a case front wall. On the other hand, in the planetary gear set G2, the thrust force F3 in the left direction as indicated acts on the small-diameter sun gear S3; and the equal thrust force in the right direction as indicated acts on the small-diameter ring gear R3. In this case, the thrust force of the small-diameter sun gear S3 is transmitted to the left wall of the case 10 via the bearings 36, 38 in the force transmission route. The thrust force of the ring gear R3 is transmitted to the support 10s via the bearing 18. Therefore, during first gear (1st) driving, the invention is structured with an oil pump case 10p, thereby preventing a thrust load from being applied to a rigidly disadvantageous right wall; and the thrust force generated at the planetary gear set G2 is loaded on the left wall of the case 10 and the support wall 10s.

FIG. 23 graphically depicts the thrust force applied to each bearing during driving in each gear change stage (in the table, values are omitted, but the value of each of the thrust forces F1 to F3 is equal to those shown in FIG. 15). As seen in the table, the thrust force F1 applied to the bearing 31 is equal that of the fifth embodiment. On the other hand, the thrust force F3 of the small-diameter sun gear S3 of the planetary gear set G2 is applied intact to both of the bearings 36, 38. In this case, the bearing 36 has a small relative rotational difference, whereas the bearing 38 has a large relative rotational difference, resulting in an increase in the bearing load.

Next, during second gear (2nd) driving, the large diameter sun gear S2 shares a reaction force torque for power transmission for the reason stated with respect to the first embodiment. Thus, a thrust force F2 acts. The thrust force F2 is transmitted to the coupling member 12 via second bearings 34, 32. As a result, an imbalanced force is generated on a balanced reduction planetary gear G1 side, and this thrust force is loaded on the case right wall. However, the force is found to be small as shown in FIG. 15. In this case, the thrust force applied to the bearing 31 becomes equal to F1+F2. On the other hand, on the planetary gear set G2 side, the thrust force F2 of the small-diameter sun gear S3 is transmitted to the case left wall via the bearings 36, 38. Naturally, this force is equal to sum of the thrust force F2 applied to the case right wall and the thrust force F4 applied to the support wall 10p. In this case, the thrust force applied to the two bearings 36, 38 is equal to that during first gear driving.

During third gear (3rd) driving, power transmission is merely different from the one during second gear driving in that the large-diameter sun gear S2 rotates. There is no particular difference in torque sharing for the elements associated with torque transmission. Therefore, as is evident by referring to FIG. 15, a relationship in the thrust forces is the same as that during second gear driving except that the values of the forces are reduced with a decrease in the torque amplification rate due to a decrease in the reduction ratio.

Further, power transmission during fourth gear (4th) driving is in a state where a torque is not transmitted from the large-diameter sun gear S2 counter to what occurs in the third gear driving. Therefore, in this case, a relationship of the thrust forces becomes a closed loop in the same manner as that during first gear driving together with the reduction planetary gear G1 and planetary gear set G2. Power is not transmitted to the case 10, and the thrust force applied to each of the bearings 31, 36, 38 is reduced with a decrease in the torque amplification rate.

Next, during fifth gear (5th) driving, shown in FIG. 22, as was discussed with respect to power transmission in the first embodiment, power transmission is different from that during any other gear driving, and the large-diameter sun gear S2 enters a state in which the sun gear S2 receives a driving torque via the long pinion P2 in response to an output of the ring gear R3. As a result, the thrust force F2 applied to the large-diameter sun gear S2 is directionally opposite to that applied during third gear driving; and the thrust force F2 is transmitted to the case left wall through bearings 35', 36, 38 in the force transmission route marked with the mark ● in the figure. In contrast, on the reduction planetary gear G1 side, the thrust force P1 of the sun gear Si and the ring gear R1 is directionally opposed to that occurring during first to fourth gear driving. Thus, the thrust force of the sun gear Si is transmitted intact to the case 10 front wall; and the thrust force of the ring gear R1 is transmitted to the case 10 left wall through the bearings 32, 34, large-diameter sun gear S2, the bearing 35', small-diameter sun gear S3, and bearings 36, 38. Therefore, the thrust force F1 is loaded to the right wall of the case 10; the thrust force F1+F2 is loaded to the left wall thereof; and the thrust force F4 is loaded to the support wall 10s. However, in this gear change stage, the transmission torque is small due to acceleration. As is evident by referring to FIG. 15, the thrust force itself is extremely small in comparison with that during second or third gear driving and, thus, the load applied to the case 10 and the bearing load are smaller than those during each of the lower gear change stages.

During the sixth gear (6th) driving, during power transmission the torque transmission on the reduction planetary gear G1 side is eliminated and, thus, the thrust force due to the sun gear S1 and ring gear R1 is also eliminated as was the case during fifth gear driving. The thrust force on the planetary gear set G2 side is similar to that during fifth gear driving.

On the other hand, during reverse (Rev) driving, in power transmission, an output of the ring gear R3 is inverted in response to an input of the large-diameter sun gear S2. Thus, the thrust force F4 of the ring gear R3 is departed from the thrust force F2 of the large-diameter sun gear S2. In this case, the thrust force F4 of the ring gear R3 is supported by the support wall 10s via the bearing 18. In addition, the thrust force F2 of the large-diameter sun gear S2 is transmitted to the right wall of the case 10 through the sun gear S1 via three right side bearings 34, 32, 31. The thrust force F1 on the reduction planetary gear G1 side is balanced between the sun gear S1 and the ring gear R1. Therefore, during reverse driving, a thrust load is not applied to the left wall of the case 10; the thrust load F2 is applied to the right wall; and the thrust load F4 is supported on the support wall 10s. In this case, the bearing 31 receives a relatively large thrust force between the case 10 and the coupling member 12. Therefore, the bearing 31 is required to have a suitable capacity during reverse driving. In actual vehicle travel, reverse driving occurs for a very short time. Therefore, it is not necessary to provide a large capacity to ensure bearing durability.

Figure 24:
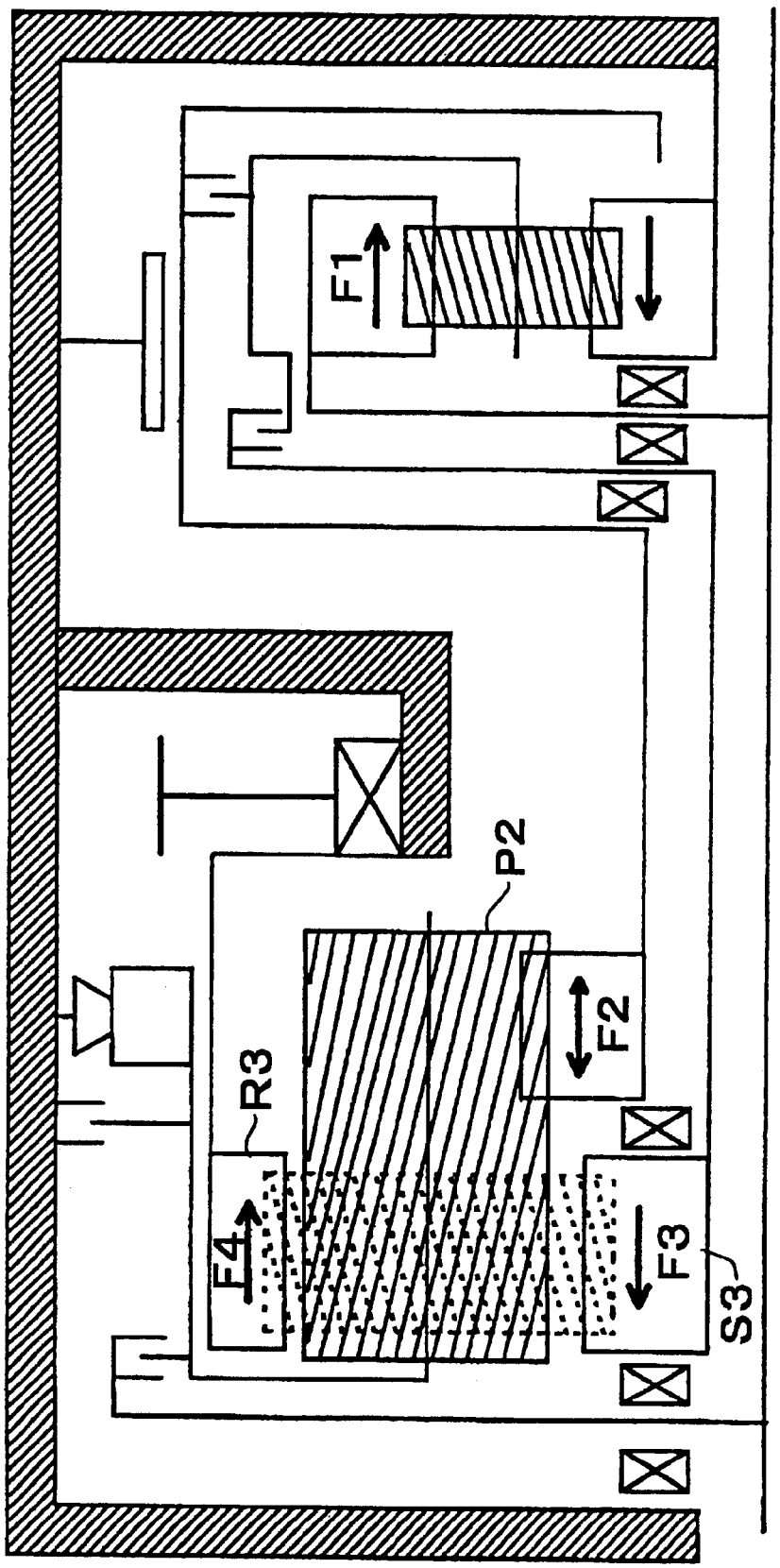
FIG. 24 is a schematic cross-sectional view showing a gear train according to an eighth embodiment.

In the aforementioned seventh embodiment, with respect to a structure of the planetary gear set G2, although the ring gear R3 is arranged to be geared with the long pinion P2 on the outer circumference side of the large-diameter sun gear S2, the ring gear R3 may be arranged to be geared with the long pinion P2 on the outer circumference side of the short-diameter sun gear S3. FIG. 24 is a schematic cross-sectional view showing a gear train according to an eighth embodiment in which such an arrangement is adopted. Even if such arrangement is adopted, the relationship in the thrust forces is similar to the case of the seventh embodiment and a similar effect is obtained.

Figure 25:
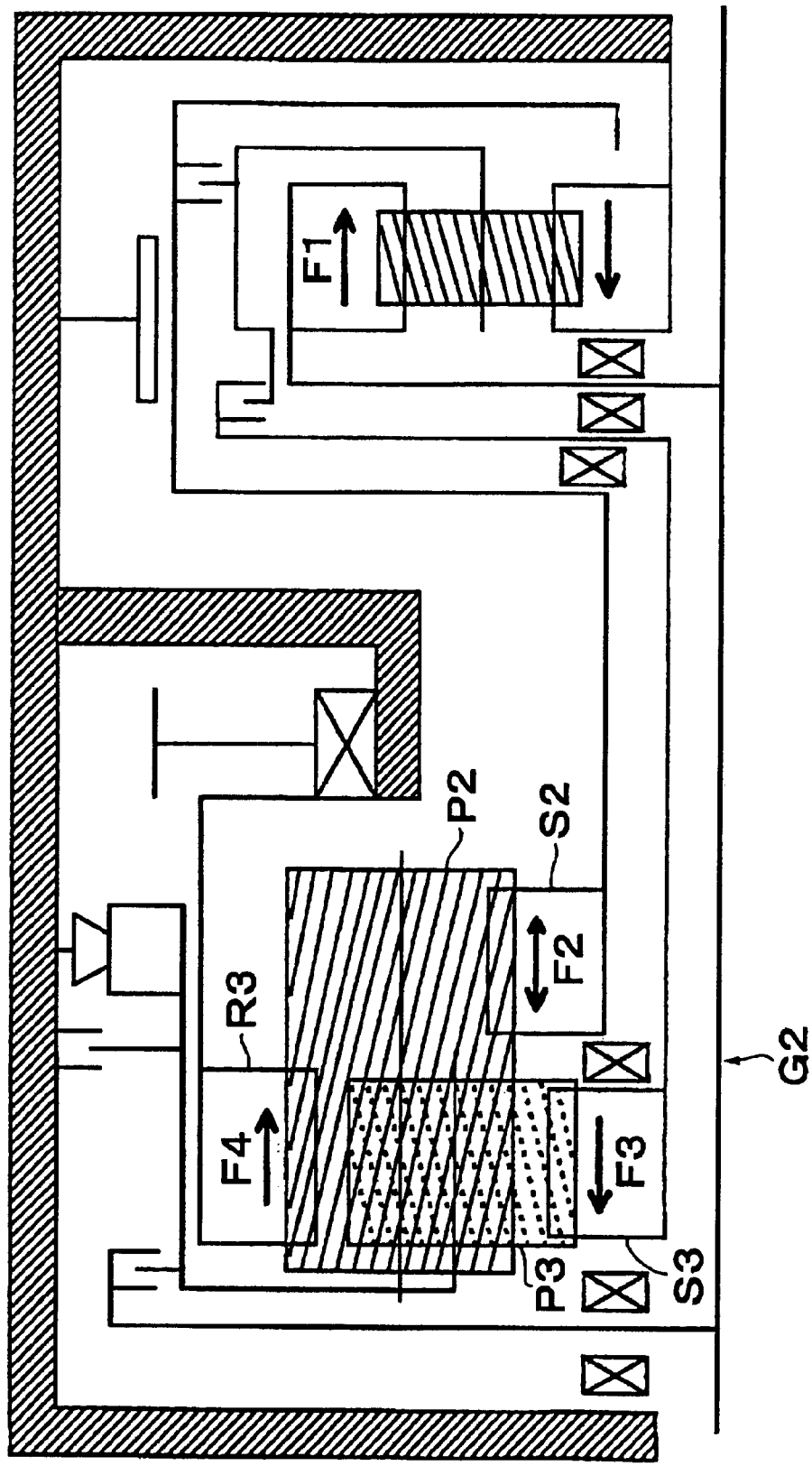
FIG. 25 is a schematic cross-sectional view showing a gear train according to a ninth embodiment.

Finally, FIG. 25 is a schematic cross-sectional view showing a ninth embodiment in which, with respect to a structure of the planetary gear set G2, the short pinion P3 and the ring gear R3 are increased in diameter more significantly than found in the seventh embodiment; and the long pinion P2 is geared with the large-diameter sun gear S2. In this case also, the occurrence of a rotational moment in the long pinion P2 can be prevented and, thus, a load applied to its rotation support portion can be reduced. Even if such structure is adopted, the relationship in thrust forces is similar to those in the case of the aforementioned seventh and eighth embodiments, and a similar effect can be obtained.

Although the invention has been described above by way of nine embodiments, each of these embodiments is provided for the purpose of exemplification. The invention can be practiced by variously changing a specific structure within the scope of the disclosure and its inherent teachings.

What is claimed is:

1. An automatic transmission for achieving a multi-stage gear change, comprising:
   an input shaft;
   a fixed reaction force element;
   a reduction planetary gear, coupled to the input shaft and the fixed reaction force element so as to output a reduction rotation to an output element; and
   a planetary gear set, that outputs a speed shift rotation with a variable speed depending on a shift position, upon input of the reduction rotation from the reduction planetary gear, wherein
   helical teeth of respective elements have a torsion direction set such that a direction of the thrust force of one element of the reduction planetary gear and a direction of the thrust force of one element of the planetary gear set are different from each other on a common force transmission route, in which the thrust forces generated respectively at one element of the reduction planetary gear and one element of the planetary gear set are transmitted, during driving at one of a plurality of gear speeds, and wherein the torsion direction is set such that a thrust force generated at the one element of the reduction planetary gear and a thrust force generated at the one element of the planetary gear set face with each other during driving at one of a plurality of gear speeds and further comprising:

a bearing subjected to thrust forces generated at the respective elements in common is provided in the common force transmission route, and the bearing is subjected to a differential thrust force between a thrust force acting on the one element of the planetary gear set and a thrust force acting on the one element of the reduction planetary gear.

2. The automatic transmission according to claim 1 further comprising the common force transmission route to which thrust forces are transmitted during driving at at least the one of the plurality of gear speeds.

3. The automatic transmission according to claim 2, wherein the common force transmission route transmits the thrust forces during driving at least at a first gear speed.

4. An automatic transmission for achieving a multi-stage gear change, comprising:
an input shaft;
a fixed reaction force element;
a reduction planetary gear, coupled to the input shaft and the fixed reaction force element so as to output a reduction rotation to an output element; and
a planetary gear set, that outputs a speed shift rotation with a variable speed depending on a shift position, upon input of the reduction rotation from the reduction planetary gear, wherein
helical teeth of respective elements have a torsion direction set such that a direction of the thrust force of one element of the reduction planetary gear and a direction of the thrust force of one element of the planetary gear set are different from each other on a common force transmission route, in which the thrust forces generated respectively at one element of the reduction planetary gear and one element of the planetary gear set are transmitted, during driving at one of a plurality of gear speeds, and wherein the torsion direction is set such that the thrust force generated at the one element of the reduction planetary gear and the thrust force generated at the one element of the planetary gear set depart from each other during driving at one of a plurality of gear speeds, and further comprising:
a bearing subjected to a thrust force generated at one of the respective elements in the common force transmission route, the bearing subjected to one of the thrust force acting on the one element of the planetary gear set and the thrust force acting on the one element of the reduction planetary gear independently.

5. The automatic transmission according to claim 1, wherein a reaction force element of the reduction planetary gear is fixed to a case, and a thrust force to be transmitted to the common force transmission route is transmitted to the case via the bearing.

6. The automatic transmission according to claim 4, wherein a reaction force element of the reduction planetary gear is fixed to a case, and a thrust force to be transmitted to the common force transmission route is transmitted to the case via the bearing.

7. The automatic transmission according to claim 1, wherein a carrier of the planetary gear set is supported axially on the common force transmission route.

8. The automatic transmission according to claim 4, wherein a carrier of the planetary gear set is supported axially on the common force transmission route.

9. The automatic transmission according to claim 8, wherein a reaction force element of the reduction planetary gear is fixed to an oil pump case, and a thrust force generated at the one element of the reduction planetary gear is transmitted to the oil pump case via the bearing.

10. The automatic transmission according to claim 1, wherein the planetary gear set comprises:
a first sun gear as one element thereof and a second sun gear independent of the first gear; and
a bearing subjected to a thrust force acting on the second sun gear is disposed on a force transmission route different from the common force transmission route.

11. The automatic transmission according to claim 4, wherein the planetary gear set comprises:
a first sun gear as one element thereof and a second sun gear independent of the first gear; and
a bearing subjected to a thrust force acting on the second sun gear is disposed on a force transmission route different from the common force transmission route.

12. The automatic transmission according to claim 4, wherein the planetary gear set comprises:
a first sun gear and a second sun gear independent of the first sun gear; and
a bearing disposed between the first sun gear and the second sun gear.

13. The automatic transmission according to claim 4, wherein the planetary gear set comprises:
a first sun gear and a second sun gear independent of the first sun gear; and
a bearing disposed between the first sun gear and the second sun gear.

14. The automatic transmission according to claim 4, wherein the one element of the reduction planetary gear is a ring gear.

15. The automatic transmission according to claim 4, wherein a reaction force element of the reduction planetary gear is fixed to an oil pump case, and a thrust force generated at the one element of the reduction planetary gear is transmitted to the oil pump case via the bearing.

16. The automatic transmission according to claim 1 wherein the reduction planetary gear comprises:
a sun gear formed as the reaction force element;
a carrier coupled with the one element of the planetary gear set for supporting a pinion geared with the sun gear; and
a ring gear geared with a pinion supported by the carrier as the one element of the reduction planetary gear coupled with the input shaft via a coupling member, wherein a bearing is disposed between the sun gear and the coupling member.

17. The automatic transmission according to claim 16, wherein the one element of the planetary gear set is a sun gear, the coupling member is disposed between the reduction planetary gear and the planetary gear set, and a second bearing is disposed between the coupling member and the sun gear of the planetary gear set.

18. The automatic transmission according to claim 17, further comprising a case, wherein the input shaft is further coupled with a carrier of the planetary gear set via another coupling member; a third bearing is disposed between the sun gear of the planetary gear set and another coupling member; a fourth bearing is disposed between the case and another coupling member; and a thrust force of the ring gear of the reduction planetary gear is transmitted to the case via second, third, and fourth bearings during reverse driving.

19. The automatic transmission according to claim 1, wherein the planetary gear set is formed as a planetary gear set of Ravigneaux type comprising of long and short pinions supported by a carrier and geared with each other; a first sun gear geared with the long pinion; a second sun gear geared with the short pinion; and a ring gear geared with a one of the long pinion and the short pinion.

20. The automatic transmission according to claim 19, wherein the ring gear is geared with the short pinion.

21. The automatic transmission according to claim 19, wherein the ring gear is geared with the long pinion.

22. The automatic tic transmission according to claim 21, wherein the long pinion is geared with the first sun gear at one end thereof, and the ring gear is geared with the other end of the long pinion.

23. The automatic transmission according to claim 4, further comprising the common force transmission route to which thrust forces are transmitted during driving at at least the one of the plurality of gear speeds.

24. The automatic transmission according to claim 23, wherein the common force transmission route transmits the thrust forces during driving at least at a first gear speed.

* * * * *